United States Patent
Kimura et al.

(10) Patent No.: US 7,946,951 B2
(45) Date of Patent: May 24, 2011

(54) VEHICLE, DRIVING APPARATUS AND CONTROL METHOD OF BOTH

(75) Inventors: Akihiro Kimura, Toyota (JP); Toshiya Hashimoto, Toyota (JP); Shunsuke Oyama, Aichi-ken (JP); Masaya Yamamoto, Kasugai (JP); Kiyoshiro Ueoka, Nisshin (JP); Noriaki Ikemoto, Obu (JP); Masaki Nomura, Anjo (JP)

(73) Assignees: Toyota Jidosha Kabushiki Kaisha, Toyota-shi (JP); Denso Corporation, Kariya-shi (JP); Aisin AW Co., Ltd., Anjo-shi (JP)

(*) Notice: Subject to any disclaimer, the term of this patent is extended or adjusted under 35 U.S.C. 154(b) by 554 days.

(21) Appl. No.: 12/071,229

(22) Filed: Feb. 19, 2008

(65) Prior Publication Data

US 2008/0227590 A1 Sep. 18, 2008

(30) Foreign Application Priority Data

Mar. 13, 2007 (JP) ................................. 2007-063969

(51) Int. Cl.
*B60K 1/02* (2006.01)
*H02P 1/00* (2006.01)
*H02P 3/00* (2006.01)
*H02P 7/00* (2006.01)
*B60W 10/06* (2006.01)
*B60W 20/00* (2006.01)

(52) U.S. Cl. ................ 477/3; 477/7; 903/930; 903/903; 903/960; 180/65.28

(58) Field of Classification Search .................. 477/3, 7; 903/903, 951, 960; 180/65.28, 65.31, 65.22, 180/65.235, 65.24; 701/22, 101, 110
See application file for complete search history.

(56) References Cited

U.S. PATENT DOCUMENTS

| 6,308,129 | B1* | 10/2001 | Uchida ......................... 701/112 |
| 2009/0005924 | A1* | 1/2009 | Hasegawa et al. .............. 701/22 |
| 2009/0203495 | A1* | 8/2009 | Muta et al. ......................... 477/3 |
| 2009/0319109 | A1* | 12/2009 | Ando et al. ..................... 701/22 |
| 2009/0319158 | A1* | 12/2009 | Ando et al. ................... 701/106 |

FOREIGN PATENT DOCUMENTS

| JP | 2006-337170 A | 12/2005 |
| JP | 2006-233799 A | 9/2006 |

* cited by examiner

*Primary Examiner* — Tisha D Lewis
(74) *Attorney, Agent, or Firm* — Kenyon & Kenyon LLP

(57) ABSTRACT

During a standstill, a prescribed rotation speed N3, which is lower than a prescribed rotation speed N2 used during a travel at a low vehicle speed, is set as a minimum rotation speed Nemin (S410), and when a demand for an idle operation has been made (S490), the minimum rotation speed Nemin is set as a target rotation speed Ne* and the value 0 is set as a target torque Te* (S500), whereby an engine is controlled. As a result of this, it is possible to improve the fuel consumption of a vehicle when the engine is operated at idle at standstill compared to a case where the engine is operated at idle at the minimum rotation speed Nemin for which the prescribed rotation speed N2 is set regardless of whether or not the vehicle is at a standstill.

15 Claims, 8 Drawing Sheets

VEHICLE, DRIVING APPARATUS AND CONTROL METHOD OF BOTH

BACKGROUND OF THE INVENTION

1. Field of the Invention

The present invention relates to a vehicle, a driving apparatus and a control method of the vehicle and the driving apparatus.

2. Description of the Related Art

There has hitherto been proposed a vehicle that comprises an engine, a planetary gear mechanism (a power distribution and integration mechanism) whose carrier is connected to a crankshaft of the engine and whose ring gear is connected to a drive shaft coupled to a drive wheel, a first motor (motor MG1) connected to a sun gear of the power distribution and integration mechanism, and a second motor (motor MG2) connected to the drive shaft as a vehicle of this kind (refer to Japanese Patent Laid-Open No. 2006-233799). In this vehicle, in the self-supporting operation of an engine at a vehicle speed below a prescribed vehicle speed, by the self-supporting operation of the engine at a prescribed self-supporting rotation speed Nhi, which is a relatively high rotation speed, the generation of vibrations and noise due to gear rattling and the like is suppressed compared to the case of the self-supporting operation of the engine at a low rotation speed. In the self-supporting operation of an engine at a vehicle speed of not less than a prescribed vehicle speed, the fuel consumption of the vehicle is improved by the self-supporting operation of the engine at a prescribed rotation speed Nlo, which is a relatively low rotation speed.

SUMMARY OF THE INVENTION

In general, in such a vehicle, improving the fuel consumption of the vehicle is considered to be one of the important problems. For example, in the self-supporting operation of an engine at a vehicle speed below a prescribed vehicle speed, as described above, the generation of vibrations and noise due to gear rattling and the like can be suppressed by the self-supporting operation of the engine at a relatively high rotation speed. In this case, however, the fuel consumption of the engine increased compared to the case of the self-supporting operation of the engine at a low rotation speed. Therefore, even at a vehicle speed below a prescribed vehicle speed, the self-supporting operation of the engine at a low rotation speed is desirable when the possibility of the generation of vibrations and noise due to gear rattling and the like is low.

In such a vehicle, it is also desirable to ensure the opportunities for learning when the vehicle performs the idle learning of an engine during the self-supporting operation of the engine at a relatively low rotation speed.

In a vehicle, a driving apparatus and a control method of the vehicle and the driving apparatus according to the present invention, improving the fuel consumption of the vehicle is one of the objects. Also, in a vehicle, a driving apparatus and a control method of the vehicle and the driving apparatus according to the present invention, ensuring opportunities for the learning of an idle controlled variable, which is a controlled variable during the idle operation of an internal combustion engine, is one of the objects of the invention.

In a vehicle, a driving apparatus and a control method of the vehicle and the driving apparatus according to the present invention, the following means was adopted in order to achieve at least part of the above-described objects.

The present invention is directed to a vehicle including: an internal combustion engine; an electric power-mechanical power input output mechanism that is connected to a drive shaft coupled to an axle, and connected to an output shaft of the internal combustion engine so as to be rotatable independently of the drive shaft, and can input and output mechanical power to and from the drive shaft and the output shaft, with the input and output of electric power and mechanical power; an electric motor that can output mechanical power to the drive shaft; a generator capable of exchanging electric power with the electric power-mechanical power input output mechanism and the electric motor; a vehicle speed detection device that detects a vehicle speed; a standstill judgment device that judges whether or not a vehicle is at a standstill on the basis of the detected vehicle speed; and a control device that when a demand for an idle operation of the internal combustion engine has been made, controls the internal combustion engine, the electric power-mechanical power input output mechanism and the electric motor so that an idle operation of the internal combustion engine is performed at a first rotation speed and the vehicle travels by use of a power demand required for the travel in a case where it has been judged by the standstill judgment device that the vehicle is not at a standstill and during a high vehicle speed travel which is such that the detected vehicle speed is in a prescribed high vehicle speed range, controls the internal combustion engine, the electric power-mechanical power input output mechanism and the electric motor so that an idle operation of the internal combustion engine is performed at a second rotation speed higher than a first rotation speed and the vehicle travels by use of the power demand required for the travel in a case where it has been judged by the standstill judgment device that the vehicle is not at a standstill and during a low vehicle speed travel which is such that the detected vehicle speed is in a prescribed low vehicle speed range, and controls the internal combustion engine so that an idle operation of the internal combustion engine is performed at a third rotation speed lower than the second rotation speed during a standstill in a case where it has been judged by the standstill judgment device that the vehicle is at a standstill.

In the vehicle of the present invention, a judgment is made according to a vehicle speed as to whether or not the vehicle is at a standstill. In a case where it has been judged that a vehicle is not at a standstill and a demand for an idle operation of an internal combustion engine has been made during a high vehicle speed travel which is such that the vehicle speed is in a prescribed high vehicle speed range, the internal combustion engine, an electric power-mechanical power input output mechanism and an electric motor are controlled so that an idle operation of the internal combustion engine is performed at a first rotation speed and the vehicle travels by use of the drive power demand required for the travel. And in a case where it has been judged that a vehicle is not at a standstill and a demand for an idle operation of an internal combustion engine has been made during a low vehicle speed travel which is such that the vehicle speed is in a prescribed low vehicle speed range, the internal combustion engine, an electric power-mechanical power input mechanism and an electric motor are controlled so that an idle operation of the internal combustion engine is performed at a second rotation speed higher than the first rotation speed and the vehicle travels by use of the drive power demand required for the travel. This is because as described above, the generation of vibrations and noise due to gear rattling and the like is suppressed thereby. Furthermore, in a case where it has been judged that a vehicle is at a standstill and a demand for an idle operation of an internal combustion engine has been made, the internal combustion engine is controlled so that an idle operation is performed at a third rotation speed lower than the second rotation speed. As a result of this, it is possible to improve the fuel consumption of a vehicle during an idle operation of an internal combustion engine when the vehicle is at a standstill. Incidentally, examples of a vehicle at a standstill include a case where a brake is operated by the driver, and a case where the shift position of the transmission is a parking position, and usually it is thought that the drive wheel is locked. Therefore, when an internal combustion engine is operated at idle at the third rotation speed that is relatively small, it might be thought that the possibility that the driver feels vibrations, noise and the like is weak.

In one preferable application of the vehicle of the invention, the control device is a device that learns an idle controlled variable, which is a controlled variable for an idle operation of the internal combustion engine when prescribed learning conditions have held, the prescribed learning conditions including an operating condition under which the internal combustion engine is operated at idle, and a rotation speed condition under which the rotation speed of the internal combustion engine or the target rotation speed during an idle operation of the internal combustion engine is not less than the third rotation speed and lower than the second rotation speed lower than a learning upper limit rotation speed. In this connection, because during a standstill the internal combustion engine is operated at idle at the third rotation speed that is relatively low, it is possible to ensure opportunities for learning an idle controlled variable. In this case, the vehicle further includes: a temperature detection device that detects the temperature of a cooling medium of the internal combustion engine, and it is preferable that the prescribed learning conditions being conditions including a temperature condition under which the temperature of the detected cooling medium is not less than a prescribed temperature and a vehicle speed condition under which the detected vehicle speed is not more than a prescribed vehicle speed. Furthermore, it is preferable that the control device is a device that learns the idle controlled variable by judging that the learning conditions have held when all of the plurality of conditions including the operating condition and the rotation speed condition have held and the standstill judgment device sets, as a standstill-judgment vehicle speed range, a first range including the value 0 when a plurality of conditions among the prescribed learning conditions do not hold, sets, as the standstill-judgment vehicle speed range, a second range wider than the first range when only the rotation speed condition among the prescribed learning conditions does not hold, judges that the vehicle is at a standstill when the detected vehicle speed is in the set standstill-judgment vehicle speed range for a specified duration, and judges that the vehicle is not at a standstill when the detected vehicle speed is outside the set standstill-judgment vehicle speed range. If this is performed, in the vehicle of the present invention in which the internal combustion engine is operated at idle at the third rotation speed that is relatively low during a standstill, it is possible to make a standstill judgment of the vehicle more rapidly when the vehicle speed decreases gradually and the vehicle comes to a standstill, with the learning conditions except the condition for a rotation speed holding and, therefore, it is possible to start learning an idle controlled variable more rapidly. Furthermore, it is possible to prevent a judgment on a standstill and a travel of the vehicle from frequently changing to respond to slight changes in the vehicle speed.

In another preferable application of the vehicle of the invention, the standstill judgment device is a device that judges that the vehicle is at a standstill when the detected vehicle speed is in standstill-judgment vehicle speed range including the value 0 for a specified duration, and judges that the vehicle is not at a standstill when the detected vehicle speed is outside the standstill-judgment vehicle speed range. If this is performed, it is possible to prevent a judgment on a standstill and a travel of the vehicle from frequently changing to respond to slight changes in the vehicle speed.

In still another preferable application of the vehicle of the invention, the control device is a device that makes a changeover between the prescribed high vehicle speed range and the prescribed low vehicle speed range with hysteresis given to the detected vehicle speed and makes a changeover of a rotation speed during an idle operation of the internal combustion engine between the first rotation speed and the second rotation speed with hysteresis given to the detected vehicle speed. If this is performed, it is possible to prevent the rotation speed during an idle operation of the internal combustion engine from frequently changing to respond to slight changes in the vehicle speed. In the former case, when the vehicle speed is in the prescribed high vehicle speed range, it is also possible to judge that the vehicle speed is in the prescribed low vehicle speed range when the vehicle speed has become not more than a prescribed high-low changeover vehicle speed, and when the vehicle speed is in the prescribed low vehicle speed range, it is also possible to judge that vehicle speed is in the prescribed high vehicle speed range when the vehicle speed has become not less than a prescribed low-high changeover vehicle speed higher than the prescribed high-low changeover vehicle speed. In the latter case, it is also possible to adopt the following method. That is, when the idle rotation speed, which is a rotation speed used when the internal combustion engine is operated at idle, is a first rotation speed, the idle rotation speed is changed to a second rotation speed when the vehicle speed has become not more than a first rotation speed changeover vehicle speed, and when the idle rotation speed is a second rotation speed, the idle rotation speed is changed to the first rotation speed when the vehicle speed has become a speed that is not less than a second rotation speed changeover vehicle speed that is higher than the first rotation speed changeover vehicle speed.

In still another preferable application of the vehicle of the invention, the control device is a device that sets the first rotation speed as a minimum rotation speed of the internal combustion engine during the high vehicle speed travel, sets the second rotation speed as the minimum rotation speed during the low vehicle speed travel, sets the third rotation speed as the minimum rotation speed during the standstill, and performs control so that the internal combustion engine is operated at the set minimum rotation speed when a demand for an idle operation of the internal combustion engine has been made. Furthermore, it is preferable that the demand for an idle operation of the internal combustion engine is a demand made on the basis of at least one of a plurality of demands, including a demand for a warm-up operation of the internal combustion engine, a demand for an idle learning of the internal combustion engine, and a demand for an actuation of equipment that uses energy from the internal combustion engine.

In one preferable embodiment of the invention, the vehicle further includes: a status detection device that detects the status of the generator; a power-operation demand judgment device that judges whether or not a demand for a power operation, which is a demand for an operation of the internal combustion engine, has been made on the basis of the vehicle power demand required by the vehicle during the high vehicle speed travel or during the low vehicle speed travel; and a charge-operation demand judgment device that judges whether or not a demand for a charge operation, which is a demand for an operation of the internal combustion engine for charging the generator on the basis of the detected status of the generator, has been made during the standstill; and the control device being a device that controls the internal combustion engine, the electric power-mechanical power input output mechanism and the electric motor so that the internal combustion engine is operated at a target drive point based on the vehicle power demand regardless of a demand for an idle operation of the internal combustion engine and the vehicle travels by use of the drive power demand when it has been judged by the power operation demand judgment device that the power operation demand has been made during the high vehicle speed travel or during the low vehicle speed travel, and controls the internal combustion engine and the electric power-mechanical power input output mechanism so that the generator is charged regardless of a demand for an idle operation of the internal combustion engine when it has been judged that the demand for a charge operation has been made during the standstill. If this is performed, when a demand for a power operation has been made during a high vehicle speed travel or during a low vehicle speed travel, it is possible to easily meet the demand by using the vehicle power demand, and when a demand for a charge operation has been made during a standstill, it is possible to charge the generator.

In another preferable embodiment of the invention, the vehicle further includes: a shift position detection device that detects a shift position, and the control device being a device that performs control when the detected shift position is a parking position during the standstill so that the internal combustion engine is operated at idle by using, as the third rotation speed, a low rotation speed compared to a case where the detected shift position is a travel position. If this is performed, it is possible to further improve the fuel consumption of the vehicle when the shift position is a parking position.

It is preferable that the electric power-mechanical power input output mechanism is a mechanism that includes a generator that inputs and outputs mechanical power, and a three-shaft type power input output module that is connected to the three shafts of the drive shaft, the output shaft and a rotating shaft of the generator and, on the basis of the mechanical power input and output to and from two out of the three shafts, inputs and outputs mechanical power to a remaining shaft.

The present invention is directed to a driving apparatus that is mounted on a vehicle along with an internal combustion engine and an accumulator unit capable of charge and discharge. The driving apparatus includes: an electric power-mechanical power input output mechanism that is connected to a drive shaft coupled to an axle and connected to an output shaft of the internal combustion engine so as to be rotatable independently of the drive shaft, can exchange electric power with the accumulator unit, and can input and output mechanical power to and from the drive shaft and the output shaft, with the input and output of electric power and mechanical power; an electric motor that can exchange electric power with the accumulator unit and can output mechanical power to the drive shaft; a standstill judgment device that judges whether or not the vehicle is at a standstill on the basis of a vehicle speed; and a control device that when a demand for an idle operation of the internal combustion engine has been made, controls the internal combustion engine, the electric power-mechanical power input output mechanism and the electric motor so that an idle operation of the internal combustion engine is performed at a first rotation speed and the vehicle travels by use of the power demand required for the travel in a case where it has been judged by the standstill judgment device that the vehicle is not at a standstill and during a high vehicle speed travel which is such that the vehicle speed is in a prescribed high vehicle speed range, controls the internal combustion engine, the electric power-mechanical power input output mechanism and the electric motor so that an idle operation of the internal combustion engine is performed at a second rotation speed higher than the first rotation speed and the vehicle travels by use of the power demand required for the travel in a case where it has been judged by the standstill judgment device that the vehicle is not at a standstill and during a low vehicle speed travel which is such that the vehicle speed is in a prescribed low vehicle speed range, and controls the internal combustion engine so that an idle operation of the internal combustion engine is performed at a third rotation speed lower than the second rotation speed during a standstill in a case where it has been judged by the standstill judgment device that the vehicle is at a standstill.

In the driving apparatus of the present invention, a judgment is made according to a vehicle speed as to whether or not the vehicle is at a standstill. In a case where it has been judged that a vehicle is not at a standstill and a demand for an idle operation of an internal combustion engine has been made during a high vehicle speed travel which is such that the vehicle speed is in a prescribed high vehicle speed range, the internal combustion engine, an electric power-mechanical power input output mechanism and an electric motor are controlled so that an idle operation of the internal combustion engine is performed at a first rotation speed and the vehicle travels by use of the drive power demand required for the travel. And in a case where it has been judged that a vehicle is not at a standstill and a demand for an idle operation of an internal combustion engine has been made during a low vehicle speed travel which is such that the vehicle speed is in a prescribed low vehicle speed range, the internal combustion engine, an electric power-mechanical power input output mechanism and an electric motor are controlled so that an idle operation of the internal combustion engine is performed at a second rotation speed higher than the first rotation speed and the vehicle travels by use of the drive power demand required for the travel. This is because as described above, the generation of vibrations and noise due to gear rattling and the like is suppressed thereby. Furthermore, in a case where it has been judged that a vehicle is at a standstill and a demand for an idle operation of an internal combustion engine has been made, the internal combustion engine is controlled so that an idle operation is performed at a third rotation speed lower than the second rotation speed. As a result of this, it is possible to improve the fuel consumption of a vehicle during an idle operation of an internal combustion engine when the vehicle is at a standstill. Incidentally, examples of a vehicle at a standstill include a case where a brake is operated by the driver, and a case where the shift position of the transmission is a parking position, and usually it is thought that the drive wheel is locked. Therefore, when an internal combustion engine is operated at idle at the third rotation speed that is relatively low, it might be thought that the possibility that the driver feels vibrations, noise and the like is weak.

The present invention is directed to a control method of a vehicle including: an internal combustion engine; an electric power-mechanical power input output mechanism that is connected to a drive shaft coupled to an axle, and connected to an output shaft of the internal combustion engine so as to be rotatable independently of the drive shaft, and can input and output mechanical power to and from the drive shaft and the output shaft, with the input and output of electric power and mechanical power; an electric motor that can output mechanical power to the drive shaft; a generator capable of exchanging electric power with the electric power-mechanical power input output mechanism and the electric motor. The control method of a vehicle includes the steps of: (a) judging whether or not a vehicle is at a standstill on the basis of a vehicle speed; and (b) when a demand for an idle operation of the internal combustion engine has been made, controlling the internal combustion engine, the electric power-mechanical power input output mechanism and the electric motor so that an idle operation of the internal combustion engine is performed at a first rotation speed and the vehicle travels by use of the power demand required for the travel in a case where it has been judged that the vehicle is not at a standstill and during a high vehicle speed travel which is such that the vehicle speed is in a prescribed high vehicle speed range, controlling the internal combustion engine, the electric power-mechanical power input output mechanism and the electric motor so that an idle operation of the internal combustion engine is performed at a second rotation speed higher than a first rotation speed and the vehicle travels by use of the power demand required for the travel in a case where it has been judged that the vehicle is not at a standstill and during a low vehicle speed travel which is such that the vehicle speed is in a prescribed low vehicle speed range, and controlling the internal combustion engine so that an idle operation of the internal combustion engine is performed at a third rotation speed lower than the second rotation speed during a standstill in a case where it has been judged that the vehicle is at a standstill.

In the control method of the vehicle of the present invention, a judgment is made according to a vehicle speed as to whether or not the vehicle is at a standstill. In a case where it has been judged that a vehicle is not at a standstill and a demand for an idle operation of an internal combustion engine has been made during a high vehicle speed travel which is such that the vehicle speed is in a prescribed high vehicle speed range, the internal combustion engine, an electric power-mechanical power input output mechanism and an electric motor are controlled so that an idle operation of the internal combustion engine is performed at a first rotation speed and the vehicle travels by use of the drive power demand required for the travel. And in a case where it has been judged that a vehicle is not at a standstill and a demand for an idle operation of an internal combustion engine has been made during a low vehicle speed travel which is such that the vehicle speed is in a prescribed low vehicle speed range, the internal combustion engine, an electric power-mechanical power input output mechanism and an electric motor are controlled so that an idle operation of the internal combustion engine is performed at a second rotation speed higher than the first rotation speed and the vehicle travels by use of the drive power demand required for the travel. This is because as described above, the generation of vibrations and noise due to gear rattling and the like is suppressed thereby. Furthermore, in a case where it has been judged that a vehicle is at a standstill and a demand for an idle operation of an internal combustion engine has been made, the internal combustion engine is controlled so that an idle operation is performed at a third rotation speed lower than the second rotation speed. As a result of this, it is possible to improve the fuel consumption of a vehicle during an idle operation of an internal combustion engine when the vehicle is at a standstill. Incidentally, examples of a vehicle at a standstill include a case where a brake is operated by the driver, and a case where the shift position of the transmission is a parking position, and usually it is thought that the drive wheel is locked. Therefore, when an internal combustion engine is operated at idle at the third rotation speed that is relatively small, it might be thought that the possibility that the driver feels vibrations, noise and the like is weak.

The present invention is directed to a control method of a driving apparatus that is mounted on a vehicle along with an internal combustion engine and an accumulator unit capable of charge and discharge. The driving apparatus includes: an electric power-mechanical power input output mechanism that is connected to a drive shaft coupled to an axle and connected to an output shaft of the internal combustion engine so as to be rotatable independently of the drive shaft, can exchange electric power with the accumulator unit, and can input and output mechanical power to and from the drive shaft and the output shaft, with the input and output of electric power and mechanical power; an electric motor that can exchange electric power with the accumulator unit and can output mechanical power to the drive shaft. The control method of a driving apparatus includes the steps of: (a) judging whether or not a vehicle is at a standstill on the basis of a vehicle speed; and (b) when a demand for an idle operation of the internal combustion engine has been made, controlling the internal combustion engine, the electric power-mechanical power input output mechanism and the electric motor so that an idle operation of the internal combustion engine is performed at a first rotation speed and the vehicle travels by use of the power demand required for the travel in a case where it has been judged that the vehicle is not at a standstill and during a high vehicle speed travel which is such that the vehicle speed is in a prescribed high vehicle speed range, controlling the internal combustion engine, the electric power-mechanical power input output mechanism and the electric motor so that an idle operation of the internal combustion engine is performed at a second rotation speed higher than a first rotation speed and the vehicle travels by use of the power demand required for the travel in a case where it has been judged that the vehicle is not at a standstill and during a low vehicle speed travel which is such that the vehicle speed is in a prescribed low vehicle speed range, and controlling the internal combustion engine so that an idle operation of the internal combustion engine is performed at a third rotation speed lower than the second rotation speed during a standstill in a case where it has been judged that the vehicle is at a standstill.

In the control method of the driving apparatus of the present invention, a judgment is made according to a vehicle speed as to whether or not the vehicle is at a standstill. In a case where it has been judged that a vehicle is not at a standstill and a demand for an idle operation of an internal combustion engine has been made during a high vehicle speed travel which is such that the vehicle speed is in a prescribed high vehicle speed range, the internal combustion engine, an electric power-mechanical power input output mechanism and an electric motor are controlled so that an idle operation of the internal combustion engine is performed at a first rotation speed and the vehicle travels by use of the drive power demand required for the travel. And in a case where it has been judged that a vehicle is not at a standstill and a demand for an idle operation of an internal combustion engine has been made during a low vehicle speed travel which is such that the vehicle speed is in a prescribed low vehicle speed range, the internal combustion engine, an electric power-mechanical power input output mechanism and an electric motor are controlled so that an idle operation of the internal combustion engine is performed at a second rotation speed higher than the first rotation speed and the vehicle travels by use of the drive power demand required for the travel. This is because as described above, the generation of vibrations and noise due to gear rattling and the like is suppressed thereby. Furthermore, in a case where it has been judged that a vehicle is at a standstill and a demand for an idle operation of an internal combustion engine has been made, the internal combustion engine is controlled so that an idle operation is performed at a third rotation speed lower than the second rotation speed. As a result of this, it is possible to improve the fuel consumption of a vehicle during an idle operation of an internal combustion engine when the vehicle is at a standstill. Incidentally, examples of a vehicle at a standstill include a case where a brake is operated by the driver, and a case where the shift position of the transmission is a parking position, and usually it is thought that the drive wheel is locked. Therefore, when an internal combustion engine is operated at idle at the third rotation speed that is relatively low, it might be thought that the possibility that the driver feels vibrations, noise and the like is weak.

DESCRIPTION OF THE PREFERRED EMBODIMENTS

Figure 1:
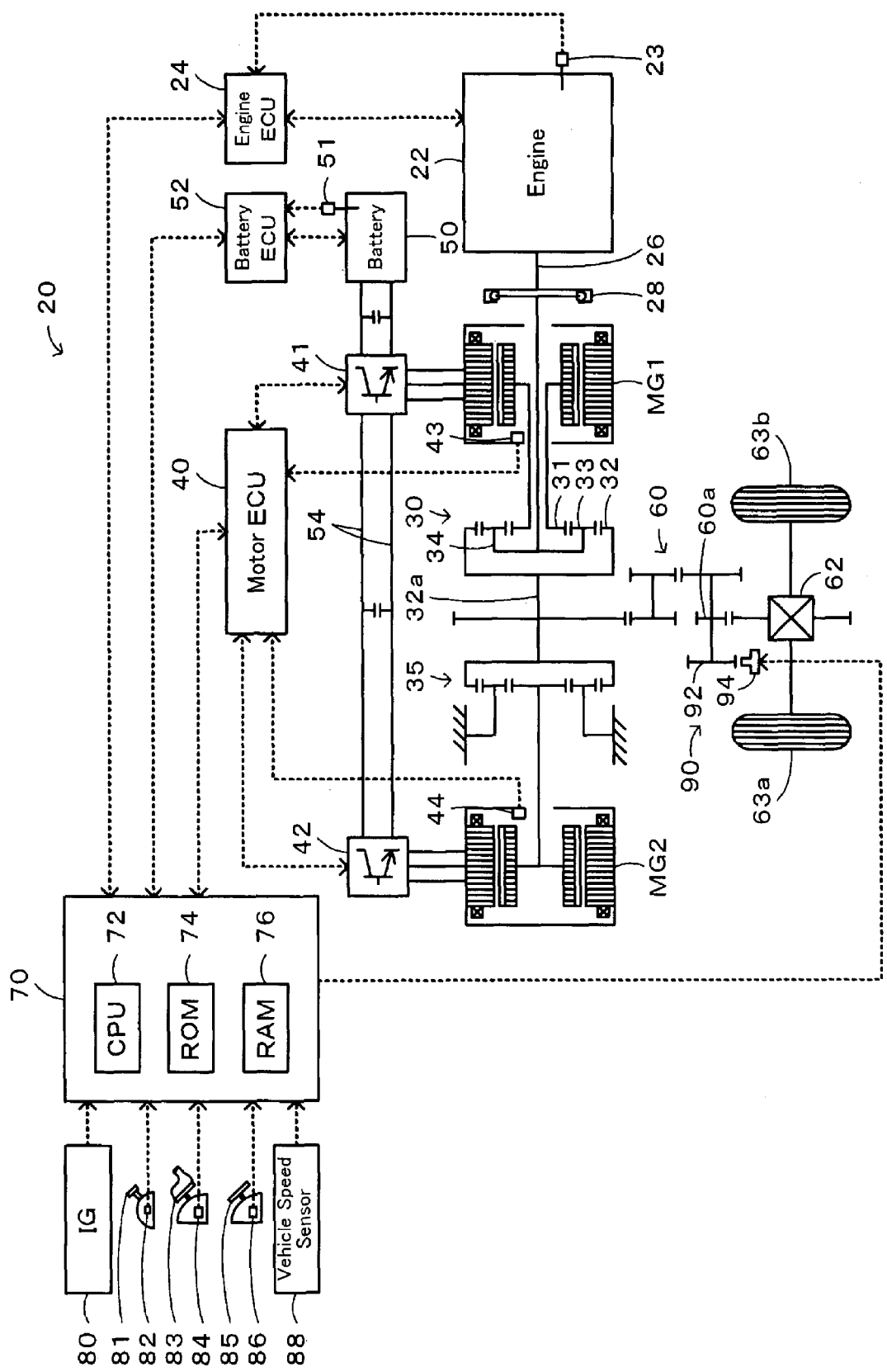
FIG. 1 is a block diagram showing a general configuration of a hybrid vehicle 20 as an embodiment of the present invention is mounted.

One mode of carrying out the invention is discussed below as a preferred embodiment. FIG. 1 schematically illustrates the construction of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole motor vehicle.

An engine 22 is an internal combustion engine that outputs power by use of a hydrocarbon-based fuel, such as gasoline and light oil, and is subjected to operation control, such as fuel injection control, ignition control and intake-air flow adjusting control, by an engine electronic control unit (hereinafter called an engine ECU) 24. To the engine ECU 24 are input signals to detect the operating condition of the engine 22 from various sensors, such as the cooling water temperature Tw from a temperature sensor 23 that detects the temperature of the cooling water of the engine 22 and the crank position from an unillustrated crank position sensor that detects the crank angle of a crankshaft 26 of the engine 22. The engine ECU 24, which communicates with a hybrid electronic control unit 70, performs the operation control of the engine 22 by use of a control signal from the hybrid electronic control unit 70 and outputs data on the operating condition of the engine 22 to the hybrid electronic control unit 70, as required. Incidentally, the engine ECU 24 computes also the rotation speed of the crankshaft 26, i.e., the rotation speed Ne of the engine 22 on the basis of the crank position from the unillustrated crank position sensor.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the drive wheels 63a and 63b via the gear mechanism 60, and the differential gear 62 from ring gear shaft 32a.

The gear mechanism 60 is provided with a parking lock mechanism 90, which is constituted by a parking gear 92 attached to a final gear 60a and a parking lock pole 94 that meshes with the parking gear 92, thereby locking the parking gear, with the rotation and drive thereof stopped. The parking lock pole 94 becomes actuated when an unillustrated actuator is subjected to drive control by the hybrid electronic control unit 70 to which an operation signal from another position to a parking position (P-position) or an operation signal from the parking position to another position has been input, and performs parking locking and a release from the parking locking by meshing with the parking gear 92 and a release from the meshing. Because the final gear 60a is mechanically connected to the drive wheels 63a and 63b, it follows that the parking lock mechanism 90 is indirectly locks the drive wheels 63a and 63b.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereinafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. Incidentally, the motor ECU 40 computes also the rotation speeds Nm1 and Nm2 of the motors MG1 and MG2 on the basis of signals from the rotational position detection sensors 43 and 44.

The battery 50 is under control of a battery electronic control unit (hereinafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. In order to control the battery 50, the battery ECU 52 computes the state of charge SOC on the basis of integrated values of charge and discharge currents detected by a current sensor, sets the charge and discharge power demand Pb* required by the battery 50 on the basis of the computed state of charge SOC, and computes the input and output restrictions Win and Wout, which are maximum allowable electric power with which the battery 50 may be charged and discharged on the basis of the computed state of charge SOC and the battery temperature Tb. Incidentally, basic values of the input and output restrictions Win and Wout are set on the basis of the battery temperature Tb, a correction coefficient for output restriction and a correction coefficient for input restriction are set on the basis of the state of charge SOC of the battery 50 and the set basic values of the input and output restrictions Win and Wout are multiplied by the correction coefficients, whereby the input and output restrictions of the battery 50 Win and Wout can be set.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

Incidentally, in the hybrid vehicle 20 of the embodiment, examples of positions of the shift lever 81 detected by the shift position sensor 82 include a parking position (P-position), a neutral position (N-position), a drive position (D-position) and a reverse position (R-position).

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
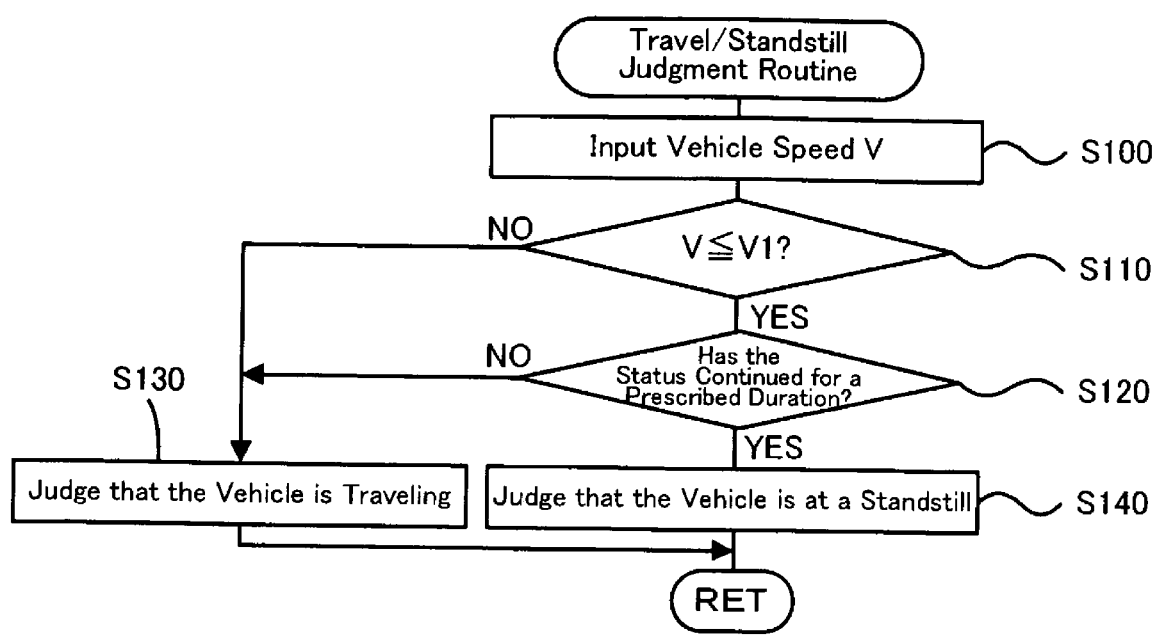
FIG. 2 is a flowchart showing an example of a travel/standstill judgment routine executed by a hybrid electronic control unit 70 of the embodiment.

Next, the operation of the hybrid vehicle 20 of the embodiment configured as described above will be described. First, a description will be given of the processing for judging whether or not the vehicle is at a standstill. FIG. 2 is a flowchart showing an example of a travel/standstill judgment routine executed by the hybrid electronic control unit 70. This routine is repeatedly executed at prescribed intervals (for example, every several milliseconds).

At the start of the execution of the travel/standstill judgment routine, the CPU 72 of the hybrid electronic control unit

70 inputs the vehicle speed V from the speed sensor 88 (Step S100) and judges whether or not the status that the input vehicle speed V is not more than a prescribed vehicle speed V1 has continued for a specified duration (Steps S110, S120). The prescribed vehicle speed V1 and the prescribed duration are used to judge whether or not the vehicle is at a standstill, the prescribed vehicle speed V1 can be, for example, 0.3 km/h and 0.5 km/h and the specified duration can be, for example, 80 msec and 100 msec. Even when the vehicle speed V is higher than the prescribed vehicle speed V1 or the vehicle speed V is not more than the prescribed vehicle speed V1, if the status has not yet continued for the prescribed duration, it is judged that the vehicle is not at a standstill, that is, the vehicle is traveling (Step S130), and the travel/standstill judgment routine is finished. When the vehicle speed V has continued the status of not more than the prescribed vehicle speed V1 for the specified duration, it is judged that the vehicle is at a standstill (Step S140) and the travel/standstill judgment routine is finished. That is, the judgment that the vehicle is traveling is immediately made when the vehicle speed V is higher than the prescribed vehicle speed V1, whereas the judgment that the vehicle is at a standstill is not made before the vehicle speed V has continued the status of not more than the prescribed vehicle speed V1 for the specified duration. As a result of this, it is possible to prevent a judgment as to whether the vehicle is traveling or at a standstill from frequently changing to respond to slight changes in the vehicle speed V. When it has been judged by this travel/standstill judgment routine that the vehicle is traveling, a control routine during a travel is executed by the hybrid electronic control unit 70. On the other hand, when it has been judged by this travel/standstill judgment routine that the vehicle is at a standstill, a control routine during a standstill is executed by the hybrid electronic control unit 70. In the following, the control routine during a travel will be first described and thereafter the control routine during a standstill will be described.

Figure 3:
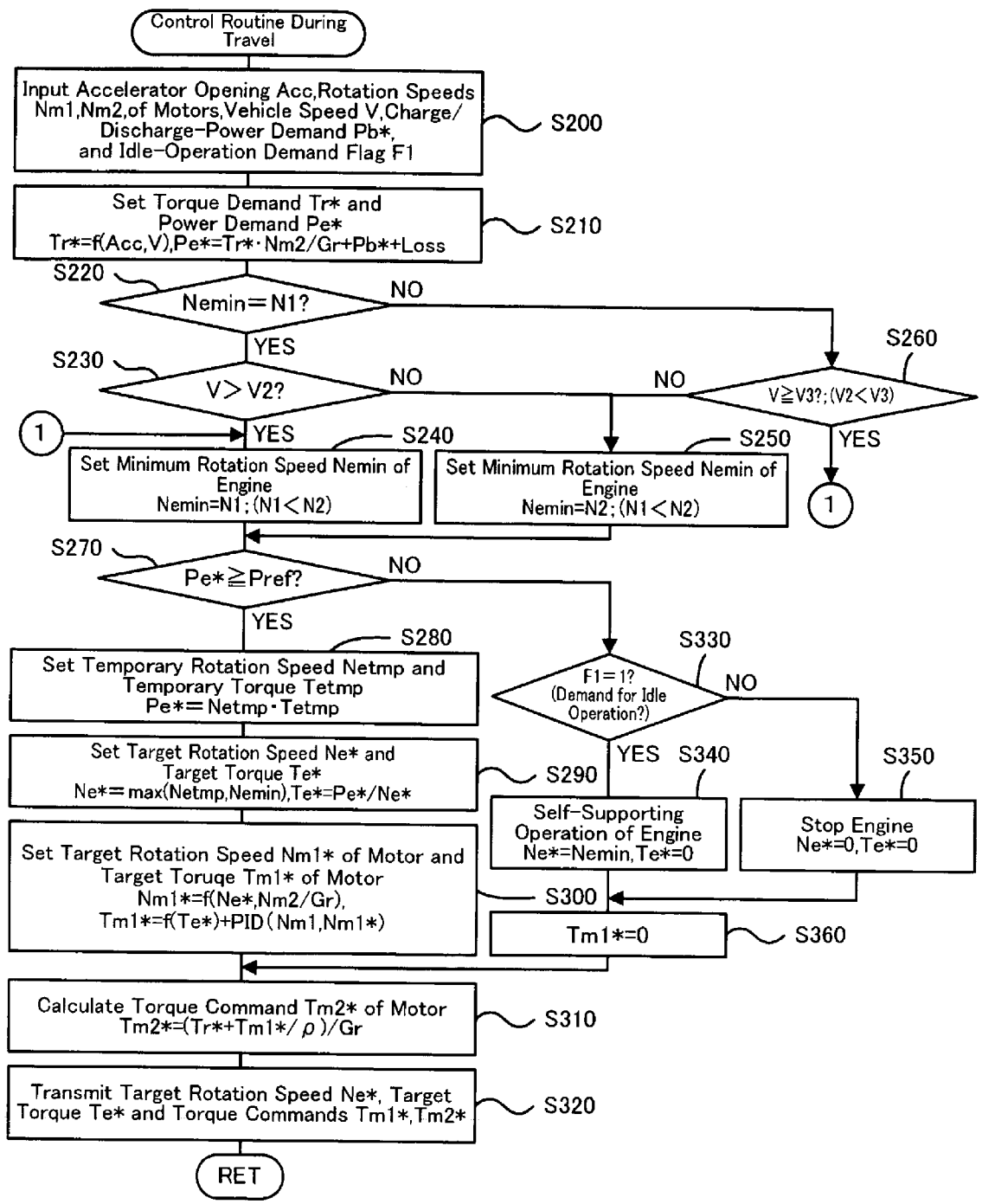
FIG. 3 is a flowchart showing an example of a control routine during a travel executed by a hybrid electronic control unit 70 of the embodiment.

FIG. 3 is a flowchart showing an example of a control routine during a travel executed by the hybrid electronic control unit 70. This routine is repeatedly executed at prescribed intervals (for example, every several milliseconds) when it has been judged by the travel/standstill judgment routine of FIG. 2 that the vehicle is traveling.

At the start of the execution of the control routine during a travel, the CPU 72 of the hybrid electronic control unit 70 first executes processing for inputting data necessary for control, such as the accelerator opening Acc from the accelerator pedal position sensor 84, the vehicle speed V from the vehicle speed sensor 88, the rotation speeds Nm1 and Nm2 of the motors MG1 and MG2, the charge-discharge power demand Pb* required by the battery 50 and an idle-operation demand flag F1 (Step S200). The rotation speeds Nm1 and Nm2 of the motors MG1 and MG2 are computed on the basis of the rotational positions of the rotors of the motors MG1 and MG2 detected by the rotational position detection sensors 43 and 44 and input from the motor ECU 40 by use of communication. The charge-discharge power Pb* is set on the basis of the state of charge SOC of the battery 50 and input from the battery ECU 52 by use of communication. For the idle-operation demand flag F1, in the embodiment, the value 1 is set when a demand for an idle operation to warm up the engine 22 has been input from the engine ECU 24, when a demand for an idle operation to perform the learning of an idle controlled variable, which is a controlled variable necessary for an idle operation of the engine 22, has been input from the engine ECU 24, when a demand for an idle operation for performing heating by use of an unillustrated heating system that heats the occupant room, with the engine 22 serving as a heat source, has been input by a heating control unit that controls the heating system, and the like, and the value 0 is set when any of these demands has not been input to the hybrid electronic control unit 70.

Figure 4:
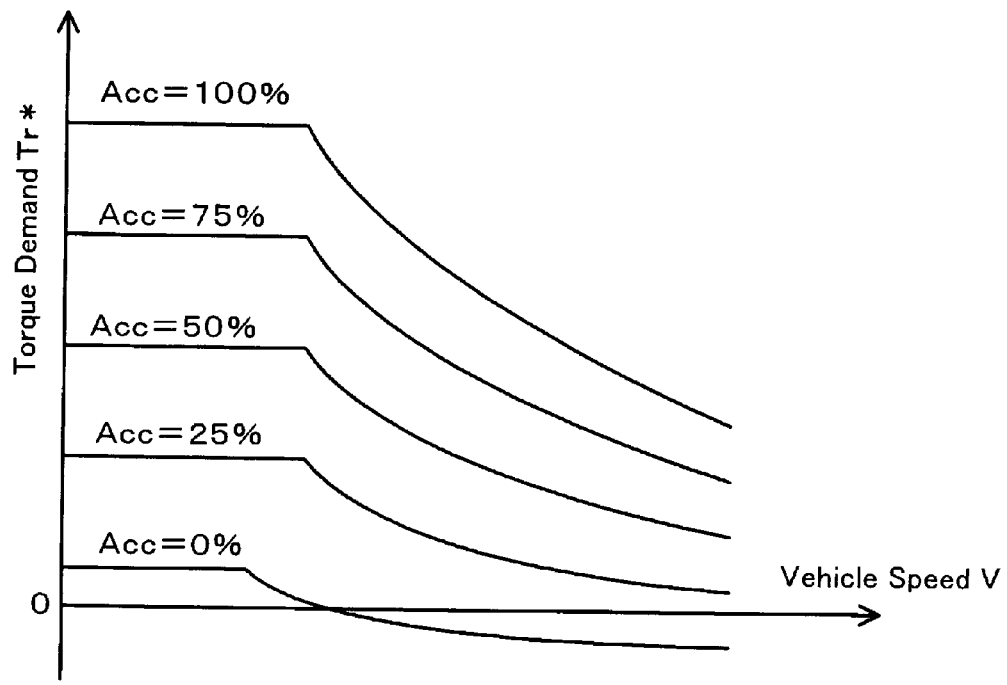
FIG. 4 is an explanatory diagram showing an example of a torque demand setting map.

When the data has been input in this way, the torque demand Tr* to be output, as the torque required of the vehicle, to the ring gear shaft 32*a* functioning as a drive shaft coupled to the drive wheels 63*a* and 63*b* and the power demand Pe* required of the engine 22 are set on the basis of the input accelerator opening Acc and the vehicle speed V (Step S210). For the torque demand Tr* in this embodiment, the relationship among the accelerator opening Acc, the vehicle speed V and the torque remand Tr* is determined beforehand and stored in the ROM 74 as a torque demand setting map, and when the accelerator opening Acc and the vehicle speed V are given, a corresponding torque demand Tr* is derived from the stored map and set. FIG. 4 shows an example of a torque demand setting map. The power demand Pe* can be calculated as a sum of the set torque demand Tr* multiplied by the rotation speed Nr of the ring gear shaft 32*a*, the charge-discharge power demand Pb* required by the battery 50 and a loss Loss. Incidentally, the rotation speed Nr of the ring gear shaft 32*a* can be found by multiplying the vehicle speed V by a conversion coefficient k (Nr=k·V) or by dividing the rotation speed Nm2 of the motor MG2 by the gear ratio Gr of the reduction gear 35 (Nr=Nm2/Gr).

Figure 5:
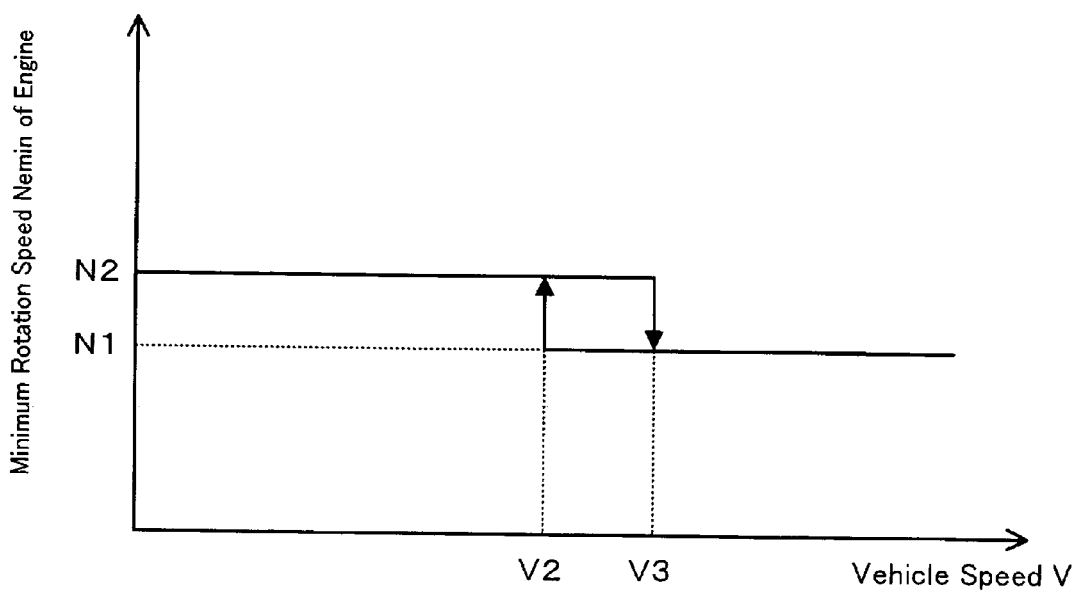
FIG. 5 is an explanatory diagram showing an example of a relationship between the vehicle speed V and the minimum rotation speed Nemin.

Subsequently, the minimum rotation speed Nemin of the engine 22 is examined (Step S220). When the minimum rotation speed Nemin of the engine 22 is a prescribed rotation speed N1 (for example, 900 rpm and 1000 rpm), the vehicle speed V is compared with a prescribed vehicle speed V2 (for example, 63 km/h and 65 km/h) (Step S230). The prescribed rotation speed N1 is set as the minimum rotation speed Nemin of the engine 22 when the vehicle speed V is higher than the prescribed vehicle speed V2 (Step S240), and a prescribed rotation speed N2 (for example, 1100 rpm and 1200 rpm) higher than the prescribed rotation speed N1 is set as the minimum rotation speed Nemin of the engine 22 at a speed lower than the prescribed vehicle speed V2 (Step S250). On the other hand, when the minimum rotation speed Nemin of the engine 22 is not the prescribed rotation speed N1, the vehicle speed V is compared with a prescribed vehicle speed V3 (for example, 67 km/h and 70 km/h) higher than the prescribed vehicle speed V2 (Step S260). When the vehicle speed V is less than the prescribed vehicle speed V3, the prescribed rotation speed N2 is set as the minimum rotation speed Nemin of the engine 22 (Step S250). When the vehicle speed V is not less than the prescribed vehicle speed V3, the prescribed rotation speed N1 is set as the minimum rotation speed Nemin of the engine 22 (Step S240). The prescribed vehicle speeds V2 and V3 are used to change over the minimum rotation speed Nemin of the engine 22 between the prescribed rotation speed N1 and the prescribed rotation speed N2, and are given hysteresis so that the minimum rotation speed Nemin does not frequently change between the prescribed rotation speed N1 and the prescribed rotation speed N2 to respond to slight changes in the vehicle speed V. An example of a relationship between the vehicle speed V and the minimum rotation speed Nemin of the engine 22 is shown in FIG. 5. As shown in the figure, the prescribed rotation speed N1 is set as the minimum rotation speed Nemin of the engine 22 when the vehicle speed V is in a high vehicle speed range, whereas the prescribed rotation speed N2 is set as the minimum rotation speed Nemin of the engine 22 when the vehicle speed V is in a low vehicle speed range. The reason why the minimum rotation speed Nemin is set in this way is as follows. When the engine 22 is operated at idle at a relatively low rotation speed, vibrations and noise due to gear rattling and the like are apt to occur due to variations in the rotation of the engine 22 caused by unstable combustion. In the embodiment, in order to eliminate such inconveniences, the prescribed rotation speed N2, which is relatively high, is set as the minimum rotation speed Nemin of the engine 22 when the vehicle speed V is in a low vehicle speed range. On the other hand, when the vehicle speed V is in a high vehicle speed range, even if such vibrations and noise occur, they are drowned out by the road noise and the like and it might be thought that the possibility that the driver feels vibrations, noise and the like is weak. Therefore, in order to improve the fuel consumption of the vehicle, the prescribed rotation speed N1, which is relatively low, is set as the minimum rotation speed Nemin of the engine 22.

Figure 6:
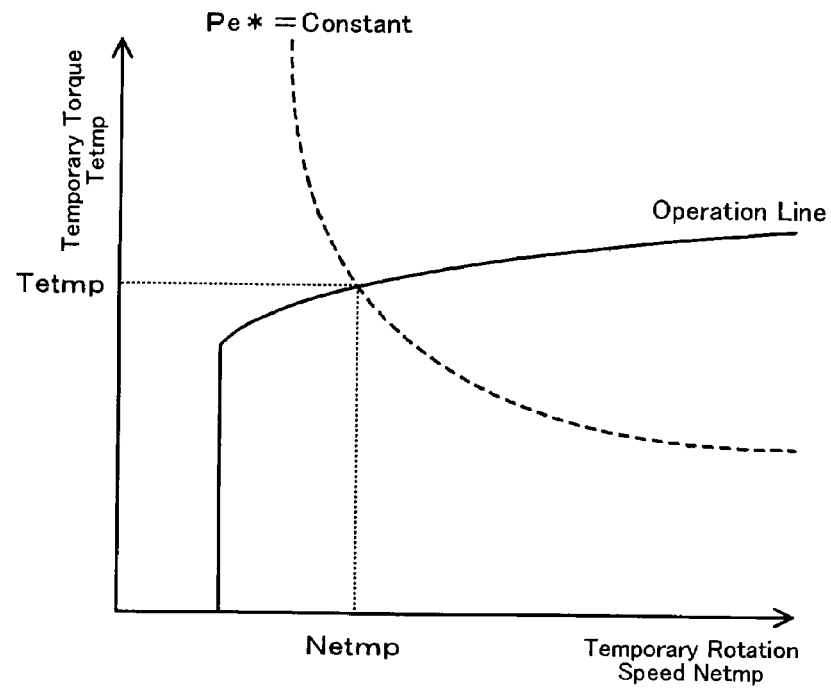
FIG. 6 is an explanatory diagram showing an example of an operation line of an engine 22 and how the temporary rotation speed Netmp and the temporary torque Tetmp are set.

Next, the power demand Pe* is compared with a threshold value Pref (Step S270). The threshold value Pref is a threshold value used to judge whether or not the engine 22 is operated on the basis of the power demand Pe* (whether or not a demand for a power operation, which is a demand for the operation of the engine 22 based on the power demand Pe*, has been made). In the embodiment, a value in the vicinity of a minimum value of the power with which the engine 22 can be operated with relatively good efficiency is used. When the power demand Pe* is not less than the threshold value Pref, it is judged that it is necessary to operate the engine 22 by use of the power demand Pe* (a demand for a power operation has been made), and the temporary rotation speed Netmp and the temporary torque Tetmp are set as a temporary drive point at which the engine 22 is to be operated on the basis of the power demand Pe* (Step S280). The set temporary rotation speed Netmp or the minimum rotation speed Nemin, whichever is higher, is set as the target rotation speed Ne* of the engine 22, and the target torque Te* is calculated by dividing the power demand Pe* by the target rotation speed Ne* (Step S290). The setting of the temporary rotation speed Netmp and the temporary torque Tetmp of the engine 22 is performed on the basis of an operation line on which the engine 22 is caused to operate with good efficiency and the power demand Pe*. FIG. 6 shows an example of an operation line of the engine 22 and how the temporary rotation speed Netmp and the temporary torque Tetmp are set. As shown in the drawing, the temporary rotation speed Netmp and the temporary torque Tetmp can be found from the point of intersection of the operation line and a curve with a constant engine power Pe* (Netmp×Tetmp).

Figure 7:
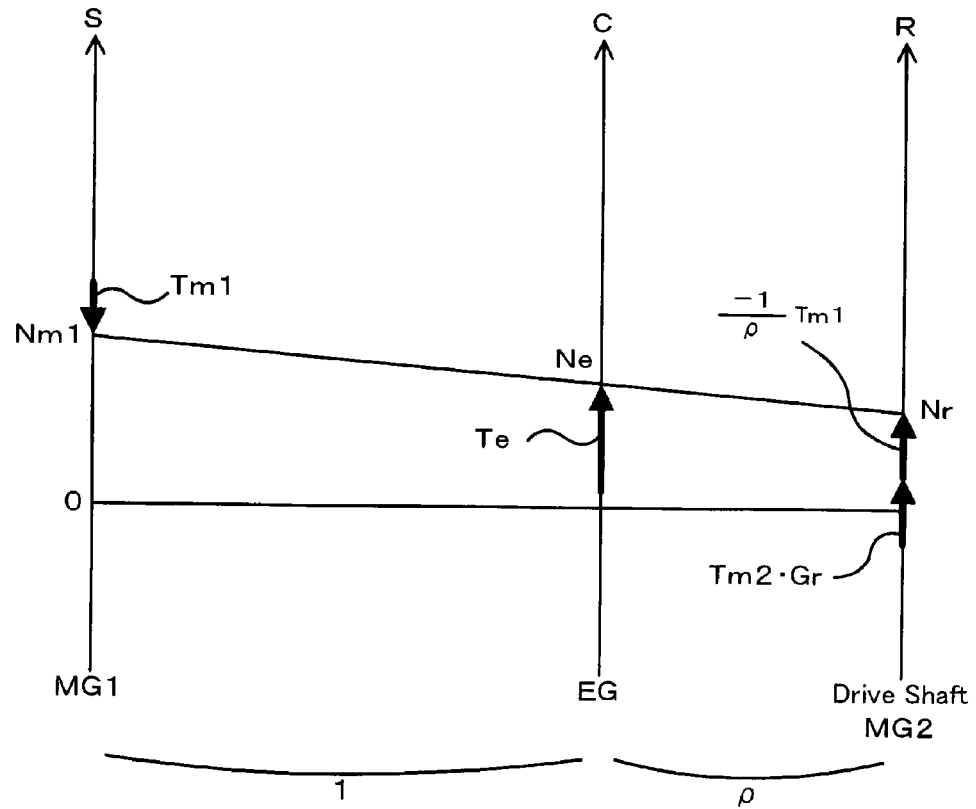
FIG. 7 is an explanatory diagram showing an example of an alignment chart that shows a mechanical relationship between the rotation speed and the torque in the rotating elements of a power distribution and integration mechanism 30 when the vehicle travels, with power output from the engine 22.

Next, the target rotation speed Nm1* of the motor MG1 is calculated by the following Equation (1) by using the target rotation speed Ne* of the engine 22, the rotation speed Nm2 of the motor MG2, the gear ratio ρ of the power distribution and integration mechanism 30 and the gear ratio Gr of the reduction gear 35, and the torque command Tm1* to be output from the motor MG1 is calculated by the Equation (2) on the basis of the calculated target rotation speed Nm1*, the input rotation speed Nm1 of the motor MG1, the target torque Te* of the engine 22 and the gear ratio ρ of the power distribution and integration mechanism 30 (Step S300), and the torque command Tm2* to be output from the motor MG2 is calculated by the following Equation (3) by adding a quotient obtained by dividing the set torque command Tm1* by the gear ratio ρ of the power distribution and integration mechanism 30 to the torque demand Tr* and further dividing the sum of this addition by the gear ratio Gr of the reduction gear 35 (Step S310). Equation (1) is a mechanical relational expression for the rotating elements of the power distribution and integration mechanism 30. FIG. 7 shows an alignment chart of a mechanical relationship between the rotation speed and torque in the rotating elements of the power distribution and integration mechanism 30, which holds when the vehicle is traveling, with power output from the engine 22. In the figure, the left S axis indicates the rotation speed of the sun gear 31, which is the rotation speed Nm1 of the motor MG1, the C axis indicates the rotation speed of the carrier 34, which is the rotation speed Ne of the engine 22, and the R axis indicates the rotation speed Nr of the ring gear 32, which is obtained by dividing the rotation speed Nm2 of the motor MG2 by the gear ratio Gr of the reduction gear 35. Equations (1) and (3) can be easily derived by using this alignment chart. Incidentally, the two heavy-line arrows on the R axis indicate the torque Tm1 output from the motor MG1, which works on the ring gear shaft 32a, and the torque Tm2 output from the motor MG2, which works on the ring gear shaft 32a via the reduction gear 35. Equation (2) is a relational expression in feedback control for rotating the motor MG1 at the target rotation speed Nm1*. In Equation (2), the second term of the right side "k1" is a gain of a proportional term, and the third term of the right side "k2" is a gain of an integral term.

$$Nm1^* = Ne^* \cdot (1+\rho)/\rho - Nm2/(Gr \cdot \rho) \qquad (1)$$

$$Tm1^* = -\rho \cdot Te^*/(1+\rho) + k1(Nm1^* - Nm1) + k2\int(Nm1^* - Nm1)dt \qquad (2)$$

$$Tm2^* = (Tr^* + Tm1^*/\rho)/Gr \qquad (3)$$

When the target rotation speed Ne* and the target torque Te* of the engine 22, and the torque commands Tm1* and Tm2* of the motors MG1 and MG2 have been set in this manner, the target rotation speed Ne* and the target torque Te* of the engine 22 are transmitted to the engine ECU 24, and the torque commands Tm1* and Tm2* of the motors MG1 and MG2 are transmitted to the motor ECU 40 (Step S320), whereby the control routine during a travel is finished. The engine ECU 24 that has received the target rotation speed Ne* and the target torque Te* performs control, such as intake-air flow control, fuel injection control and ignition control in the engine 22, so that the engine 22 is operated at the drive point indicated by the target rotation speed Ne* and the target torque Te*. The motor ECU 40 that has received the torque commands Tm1* and Tm2* performs the switching control of the switching elements of the inverters 41 and 42 so that the motor MG1 is driven on the torque command Tm1* and the motor MG2 is driven on the torque command Tm2*. As a result of the control described above, it is possible to operate the engine 22 with good efficiency and to ensure a travel, with the torque demand Tr* output to the ring gear shaft 32a functioning as the drive shaft.

When at Step S270 the power demand Pe* is less than the threshold value Pref, the value of the idle-operation demand flag F1 is examined (Step S330). When the value of the idle-operation demand flag F1 is 0, it is judged that the operation of the engine 22 is unnecessary, and the valve 0 is set for both the target rotation speed Ne* and the target torque Te* of the engine 22 in order to stop the engine 22 (Step S350), the value 0 is set for the torque command Tm1* of the motor MG1 (Step S360), the torque command Tm2* of the motor MG2 is set (Step S310), the target rotation speed Ne* and the target torque Te* of the engine 22, and the torque commands Tm1* and Tm2* of the motors MG1 and MG2 are transmitted to a corresponding ECU (Step S320), whereby the control routine during a travel is finished. The engine ECU 24 that has received the target rotation speed Ne* and the target torque Te*, both having the value 0, stops control, such as fuel injection control and ignition control, to stop the engine 22 when the engine 22 is being operated, and the engine ECU 24 maintains the status of stop when the operation of the engine 22 is stopped.

When at Step S330 the value of the idle-operation demand flag F1 is 1, it is judged that although it is unnecessary to operate the engine 22 by use of the power demand Pe*, it is necessary to operate the engine 22 due to a demand for an idle operation for reasons, such as warming up the engine 22, performing the learning of an idle controlled variable and heating by use of an unillustrated heating system. To perform an idle operation of the engine 22, the minimum rotation speed Nemin is set as the target rotation speed Ne* of the engine 22 and the value 0 is set for the target torque Te* (Step S340), the value 0 is set for the torque command Tm1* of the motor MG1 (Step S360), the torque command Tm2* of the motor MG2 is set (Step S310), and each set value is transmitted to a corresponding ECU (Step S320), whereby the control routine during a travel is finished. In this case, it follows that the engine 22 is operated at idle at the prescribed rotation speed N1, which is relatively low, when the vehicle speed V is in a high vehicle speed range, and that the engine 22 is operated at idle at the prescribed rotation speed N2, which is relatively high, when the vehicle speed V is in a low vehicle speed range. In the former case, the fuel consumption of the vehicle can be improved. In the latter case, it is possible to suppress the generation of vibrations and noise due to gear rattling and like.

Figure 8:
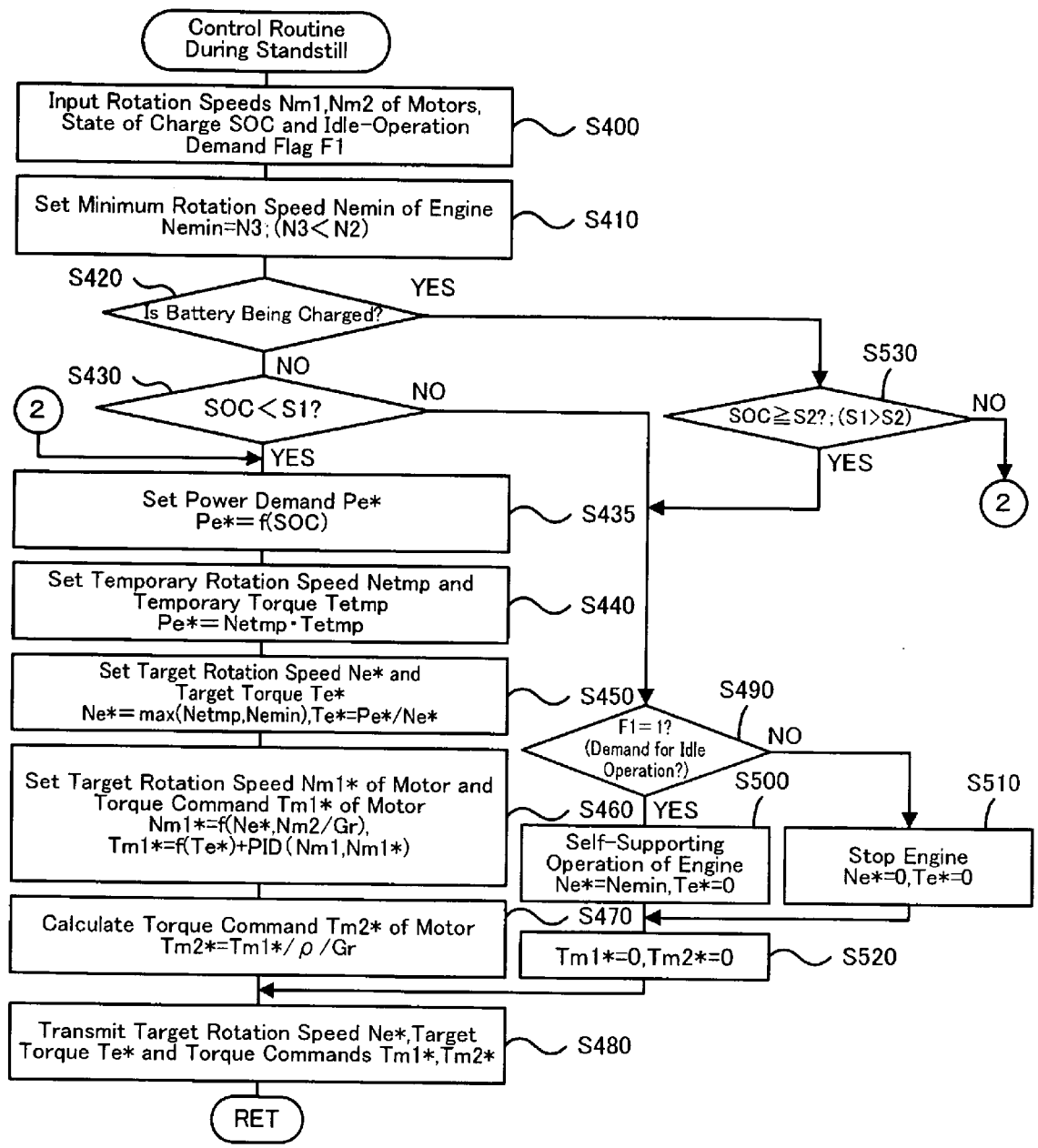
FIG. 8 is a flowchart showing an example of a control routine during a standstill that is executed by the hybrid electronic control unit 70 of the embodiment.

Next, a description will be given of control to be executed when it has been judged by the travel/standstill judgment routine of FIG. 2 that the vehicle is at a standstill. FIG. 8 is a flowchart showing an example of a control routine during a standstill that is executed by the hybrid electronic control unit 70. This routine is repeatedly executed at prescribed intervals (for example, every several milliseconds) when it has been judged by the travel/standstill judgment routine of FIG. 2 that the vehicle is at a standstill.

At the start of the execution of the control routine during a standstill, the CPU 72 of the hybrid electronic control unit 70 first inputs data necessary for control, such as the rotation speeds Nm1 and Nm2 of the motors MG1 and MG2, the state of charge SOC of the battery 50 and the idle-operation demand flag F1 (Step S400). The rotation speeds Nm1 and Nm2 of the motors MG1 and MG2 and the idle-operation demand flag F1 can be input in the same manner as with the processing at Step S100 of the control routine during a travel shown in FIG. 3. The state of charge SOC of the battery 50 is computed on the basis of integrated values of charge and discharge currents detected by the current sensor and input from the battery ECU 52 by use of communication.

Subsequently, the prescribed rotation speed N3 lower than the above-described prescribed rotation speed N2 (for example, 1100 rpm and 1200 rpm) as the minimum rotation speed Nemin of the engine 22 is set (Step S410). For example, the same rotation speed as the prescribed rotation speed N1 (for example, 900 rpm and 1000 rpm) or a rotation speed in the vicinity thereof can be used as the prescribed rotation speed N3.

Next, a judgment is made as to whether or not the battery 50 is being charged (Step S420). When it has been judged that the battery 50 is not being charged, the state of charge SOC of the battery 50 is compared with a prescribed value S1 (Step S430). The prescribed value S1 is used to judge whether or not it is necessary to charge the battery 50, and for example, values such as 35% and 40% can be used as the prescribed value S1. When the state of charge SOC of the battery 50 is less than the prescribed value S1, it is judged that it is necessary to charge the battery 50, the power demand Pe* is set on the basis of the state of charge SOC of the battery 50 (Step S435), the temporary rotation speed Netmp and the temporary torque Tetmp are set as a temporary drive point at which the engine 22 can be operated with good efficiency on the basis of the set power demand Pe* (Step S440), the set temporary rotation speed Netmp or the minimum rotation speed Nemin, whichever is higher, is set as the target rotation speed Ne* of the engine 22, and the target torque Te* is calculated by dividing the power demand Pe* by the target rotation speed Ne* (Step S450).

Figure 9:
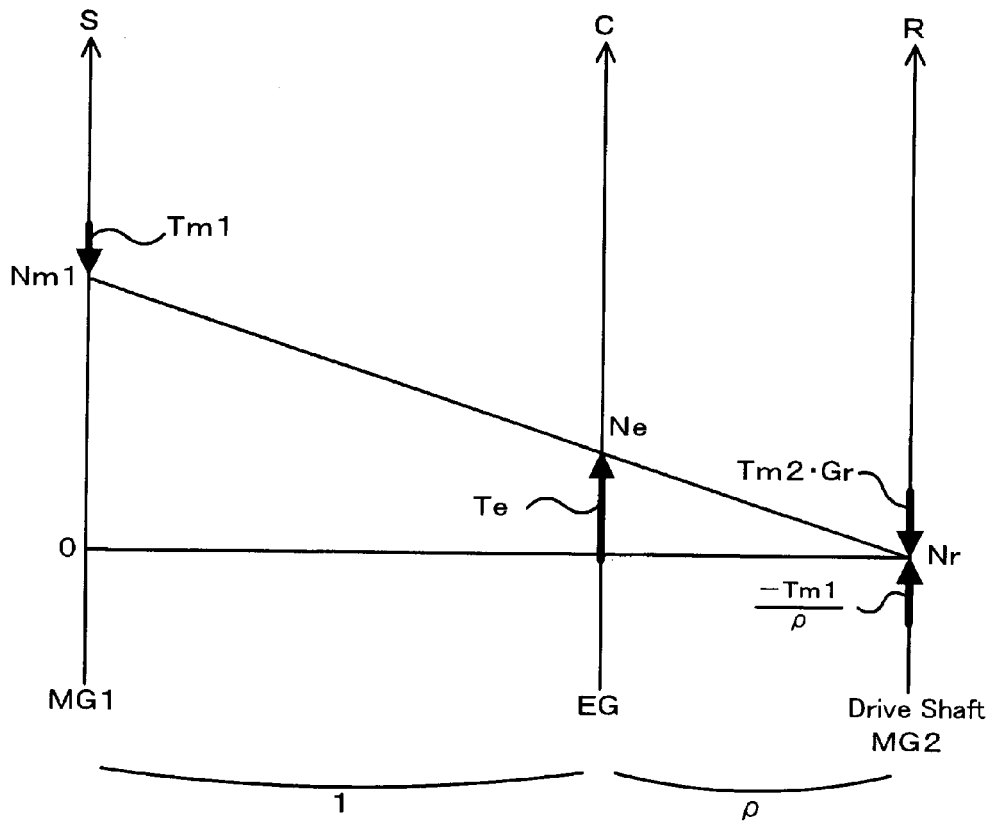
FIG. 9 is an explanatory diagram showing an example of an alignment chart that shows a mechanical relationship between the rotation speed and the torque in the rotating elements of the power distribution and integration mechanism 30 when the charge of a battery 50 is performed during a standstill.

Next, the target rotation speed Nm1* of the motor MG1 and the torque command Tm1* are calculated by using Equations (1) and (2) described above (Step S460), the torque command Tm2* of the motor MG2 is calculated by Equation (4) below by using the calculated torque command Tm1*, the gear ratio ρ of the power distribution and integration mechanism 30 and the gear ratio Gr of the reduction gear 35 so that a torque is not output to the ring gear shaft 32a functioning as the drive shaft (Step S470), and the target rotation speed Ne* and the target torque Te* of the engine 22 are transmitted to the engine ECU 24, while the torque commands Tm1* and Tm2* of the motors MG1 and MG2 are transmitted to the motor ECU 40 (Step S480), whereby the control routine during a standstill is finished. In FIG. 9 is shown an example of an alignment chart that shows a mechanical relationship between the rotation speed and the torque in the rotating elements of the power distribution and integration mechanism 30 when the charge of a battery 50 is performed during a standstill. In the embodiment, when it is necessary to charge the battery 50 during a standstill, the charge of the battery 50 is performed while ensuring that a torque is not output to the ring gear shaft 32a functioning as the drive shaft in this manner.

$$Tm2^* = Tm1^*/\rho/Gr \quad (4)$$

When the charge of the battery 50 is started in this manner, at Step S420 it is judged that the battery 50 is being charged, and the state of charge SOC of the battery 50 is compared with a prescribed value S2, which is larger than the prescribed value S1 (Step S530). The prescribed value S2 is used to judge whether or not it is possible to finish the charge of the battery 50, and for example, values such as 60% and 65% can be used as the prescribed value S2. When the state of charge SOC of the battery 50 is less than the prescribed value S2, the processing of Step S435 and subsequent steps is executed. As a result of this, the charge of the battery 50 is continued.

When at Steps S420 and S430 the battery 50 is not being charged and the state of charge SOC of the battery 50 is not less than the prescribed value S1 and when at Step S530 the state of charge SOC of the battery 50 is set not less than the prescribed value S2, it is judged that it is unnecessary to charge the battery 50 or the charge of the battery 50 may be finished, and the value of the idle-operation demand flag F1 is examined (Step S490). When the value of the idle-operation demand flag F1 is 0, it is judged that it is unnecessary to operate the engine 22 and the value 0 is set for both the target rotation speed Ne* and the target torque Te* of the engine 22 in order to stop the engine 22 (Step S510). The value 0 is then set for both the torque commands Tm1* and Tm2* of the motors MG1 and MG2 (Step S520) and each set value is transmitted to a corresponding ECU (Step S480), whereby the control routine during a standstill is finished.

On the other hand, when at Step S490 the value of the idle-operation demand flag F1 is 1, it is judged that although it is unnecessary to operate the engine 22 by use of the power demand Pe*, it is necessary to operate the engine 22 due to a demand for an idle operation for reasons, such as warming up the engine 22, performing the learning of an idle controlled variable and heating by use of an unillustrated heating system. To perform an idle operation of the engine 22, the minimum rotation speed Nemin is set as the target rotation speed Ne* of the engine 22 and the value 0 is set for the target torque Te* (Step S500), the value 0 is set for both the torque commands Tm1* and Tm2* of the motors MG1 and MG2 (Step S520), and each set value is transmitted to a corresponding ECU (Step S320), whereby the control routine during a standstill is finished. Because in this manner the engine 22 is operated at idle at the prescribed rotation speed N3, which is relatively low, when a demand for an idle operation of the engine 22 has been made during a standstill, as in a case where the vehicle speed V is in a low vehicle speed travel range, it is possible to improve the fuel consumption of the vehicle compared to a case where the engine 22 is operated at idle at the prescribed rotation speed N2, which is relatively high. Incidentally, at this time, that is, when it is judged by the travel/standstill judgment routine of FIG. 2 that the vehicle is at a standstill, usually, it is thought that the brake pedal 85 is depressed by the driver or that the drive wheels 63a and 63b are locked by the parking lock mechanism 90, with the shift position SP being the parking position. Therefore, it might be thought that when the engine 22 is operated at idle at the prescribed rotation speed N3, which is relatively low, the possibility that the driver feels vibrations, noise and the like due to gear rattling and the like is weak.

Figure 10:
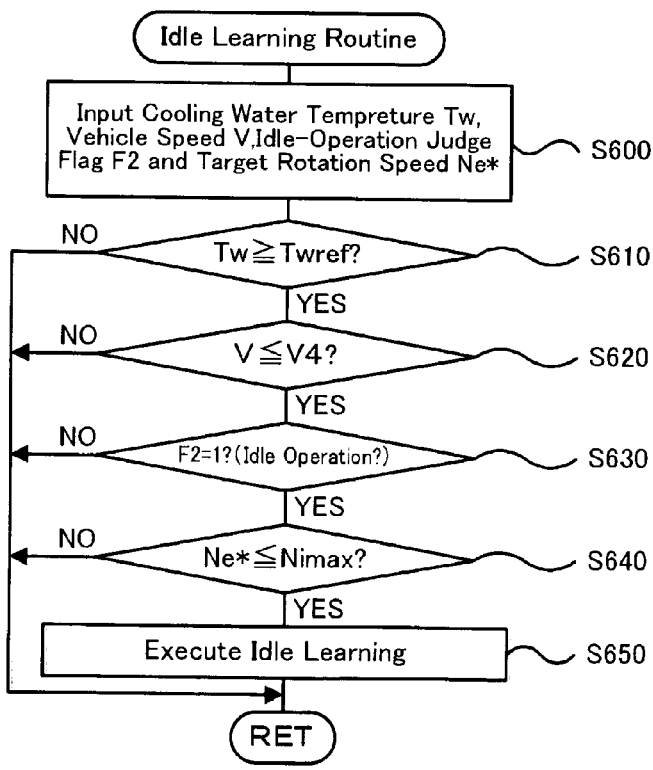
FIG. 10 is a flowchart showing an example of an idle learning routine executed by an engine ECU 24 of the embodiment.

The control of the engine 22 and the motors MG1 and MG2 during a travel and during a standstill has been described above. Next, a description will be given of an idle learning routine that is executed when the engine 22 is operated at idle. FIG. 10 is a flowchart showing an example of an idle learning routine executed by the engine ECU 24. This routine is repeatedly executed at prescribed intervals (for example, every several milliseconds).

At the start of the execution of the idle learning routine, an unillustrated CPU of the engine ECU 24 first executes processing for inputting data, such as the cooling water temperature Tw from the temperature sensor 23, the vehicle speed V, the target rotation speed Ne* and the idle-operation judgment flag F2 (Step S600). The vehicle speed V is detected by the speed sensor 88 and input via the hybrid electronic control unit 70 by use of communication. The target rotation speed Ne* of the engine 22 is set by the control routine during a travel shown in FIG. 3 and the control routine during a standstill shown in FIG. 8 and input from the hybrid electronic control unit 70 by use of communication. Furthermore, for the idle-operation command judgment flag F2, the value 1 is set by the engine ECU 24 when the engine 22 is operated at idle and the value 0 is set when the engine 22 is not operated at idle, and the idle-operation command judgment flag F2 is input by reading settings written in a prescribed region of the RAM.

When the data has been input in this manner, a judgment is made as to whether or not learning conditions hold, the learning conditions being those under which an idle learning is executed by using the input data (Steps S610 to S640). When the learning conditions hold, the learning of an idle controlled variable, which is a controlled variable used when an idle operation of the engine 22 is performed (Step S650), whereby the idle learning routine is finished. When the learning conditions do not hold, the idle learning routine is finished without the learning of an idle controlled variable is performed. In this connection, examples of the learning conditions include a condition under which the cooling water temperature Tw is not less than the prescribed temperature Twref (for example, 70 degrees and 75 degrees), a condition under which the vehicle speed V is not more than a prescribed vehicle speed V4 (for example, 10 km/h and 15 km/h), a condition under which the value of the idle-operation judgment flag F2 is 1 (the engine 22 is operated at idle), and a condition under which the target rotation speed Ne* of the engine 22 is not more than the prescribed rotation speed Nimax (not less than the prescribed rotation speed N3 and less than the prescribed rotation speed N2, for example, 1000 rpm and 1050 rpm). In the embodiment, it is judged that the learning conditions hold when all of these conditions hold. In the embodiment, the learning of a controlled variable necessary for regarding the rotation speed of the engine 22 as the target idle rotation speed (for example, the throttle opening of an unillustrated throttle valve) is performed as the learning of an idle controlled variable. A learned value is stored and used in the control during the next and later idle operations of the engine 22. As described above, in the hybrid vehicle 20 of the embodiment, in performing an idle operation of the engine 22 when the vehicle speed V is in a low vehicle speed range, the engine 22 is operated at idle at the prescribed rotation speed N2, which is relatively high, and, therefore, the learning conditions do not hold. However, in an idle operation of the engine 22 during a standstill, the engine 22 is operated at idle at the prescribed rotation speed N3, which is relatively low, and, therefore, the learning conditions hold because other conditions hold. For this reason, when it is necessary to meet the condition under which the target rotation speed Ne* of the engine 22 is not more than the prescribed rotation speed Nimax, which is not less than the prescribed rotation speed N3 and is less than the prescribed rotation speed N2, as one learning condition, in an idle operation of the engine 22 during a standstill, the engine 22 is operated at idle at the prescribed rotation speed N3, whereby it is possible to ensure opportunities for learning an idle controlled variable compared to the case where an idle operation of the engine 22 is performed at the prescribed rotation speed N2 regardless of whether or not the vehicle is at a standstill.

According to the hybrid vehicle 20 of the embodiment described above, when a demand for an idle operation has been made while the vehicle speed V is in a high vehicle speed range, the target rotation speed Ne* and the target torque Te* of the engine 22, and the torque commands Tm1* and Tm2* of the motors MG1 and MG2 are set and the engine 22 and the motors MG1 and MG2 are controlled so that the engine 22 is operated at idle at the minimum rotation speed Nemin for which the prescribed rotation speed N1, which is relatively low, is set and the torque demand Tr* is output to the ring gear shaft 32a functioning as the drive shaft, whereas when a demand for an idle operation has been made while the vehicle speed V is in a low vehicle speed range, the target rotation speed Ne* and the target torque Te* of the engine 22, and the torque commands Tm1* and Tm2* of the motors MG1 and MG2 are set and the engine 22 and the motors MG1 and MG2 are controlled so that the engine 22 is operated at idle at the minimum rotation speed Nemin for which the prescribed rotation speed N2, which is relatively high, is set and the torque demand Tr* is output to the ring gear shaft 32a functioning as the drive shaft, and contrastively when a demand for an idle operation has been made during a standstill, the target rotation speed Ne* and the target torque Te* of the engine 22 are set and the engine 22 is controlled so that the engine 22 is operated at idle at the minimum rotation speed Nemin for which a rotation speed N3, which is relatively low, is set. Therefore, it is possible to improve the fuel consumption of the vehicle when an idle operation of the engine 22 is performed during a standstill compared to the case where an idle operation of the engine 22 is performed at the minimum rotation speed Nemin, for which the prescribed rotation speed N2 is set regardless of whether or not the vehicle is at a standstill. Moreover, in the case where an idle controlled variable, which is a controlled variable used when the engine 22 is operated at idle, is learned when the learning conditions have held, the learning conditions including the condition under which the target rotation speed Ne* of the engine 22 is not more than the prescribed rotation speed Nimax, which is not less than the prescribed rotation speed N3 and is less than the prescribed rotation speed N2, and the condition under which the engine 22 is operated at idle, it is possible to ensure more opportunities for learning an idle controlled variable by operating the engine 22 at idle at the minimum rotation speed Nemin for which the prescribed rotation speed N3 is set during a standstill.

According to the hybrid vehicle 20 of the embodiment, a judgment is made as to whether or not the vehicle is at a standstill on the basis of whether or not the status that the vehicle speed V is not more than the prescribed vehicle speed V1 has continued for a prescribed duration. Therefore, it is possible to prevent a judgment on a standstill and a travel of the vehicle from frequently changing to respond to slight changes of the vehicle speed V. According to the hybrid vehicle 20 of the embodiment, hysteresis is given when the minimum rotation speed Nemin of the engine 22 is changed over between the prescribed vehicle speed N1 and the prescribed vehicle speed N2. Therefore, it is possible to prevent the minimum vehicle speed Nemin from frequently changing between the prescribed vehicle speed N1 and the prescribed vehicle speed N2 to respond to slight changes in the vehicle speed V.

In the hybrid vehicle 20 of the embodiment, a judgment is made as to whether or not the vehicle is at a standstill on the basis of whether or not the status that the vehicle speed V is not more than the prescribed vehicle speed V1 (for example, 0.3 km/h and 0.5 km/h) has continued for a prescribed duration. However, when the learning conditions except the condition under which the target rotation speed Ne* of the engine 22 is not more than the prescribed rotation speed Nimax hold, that is, when the learning conditions hold if the condition under which the target rotation speed Ne* of the engine 22 is not more than the prescribed rotation speed Nimax holds, it is also possible to use, as the prescribed vehicle speed V1, a vehicle speed (for example, 1.0 km/h and 2.0 km/h) higher than the vehicle speed (for example, 0.3 km/h and 0.5 km/h) used when multiple conditions do not hold, that is, when the learning conditions do not hold even when the condition under which the target rotation speed Ne* of the engine 22 is not more than the prescribed rotation speed Nimax holds. If this is performed, when the vehicle speed V decreases gradually and approaches the value 0 and the vehicle comes to a standstill, it is possible to make a more rapid judgment on the standstill of the vehicle. Therefore, it is possible to more rapidly meet the condition for the target rotation speed Ne* that is produced when the prescribed rotation speed N3 is set as the minimum rotation speed Nemin as a result of the judgment on the standstill of the vehicle, and it is possible to more rapidly start the learning of an idle controlled variable. Incidentally, data on which of the learning conditions does not hold can be input from the engine ECU 24 by use of communication.

In the hybrid vehicle 20 of the embodiment, a judgment is made as to whether or not the vehicle is at a standstill on the basis of whether or not the status that the vehicle speed V is not more than the prescribed vehicle speed V1 has continued for a prescribed duration. However, it is also possible to judge that the vehicle is at a standstill when the vehicle speed V is not more than the prescribed vehicle speed V1, and to judge the vehicle is not at a standstill, that is, the vehicle is traveling when the vehicle speed V is higher than the prescribed vehicle speed V1. As the conditions for judging that the vehicle is at a standstill, it is also possible to add the condition under which the brake pedal 85 is depressed in addition to the condition that the status that the vehicle speed V is not more than the prescribed vehicle speed V1 has continued for a prescribed duration.

In the hybrid vehicle 20 of the embodiment, hysteresis is given when a changeover is made between a high vehicle speed range and a low vehicle speed range, that is, when the minimum rotation speed Nemin of the engine 22 is changed over between the prescribed rotation speed N1 and the prescribed rotation speed N2. However, giving hysteresis is not restrictive in any sense. That is, it is also possible to set the prescribed rotation speed N1 as the minimum rotation speed Nemin in a high vehicle speed range when the vehicle speed V is not less than the prescribed vehicle speed V2 (or the prescribed vehicle speed V3), and to set the prescribed vehicle speed N2 as the minimum rotation speed Nemin in a low vehicle speed range when the vehicle speed V is less than the prescribed vehicle speed V2 (or the prescribed vehicle speed V3).

In the hybrid vehicle 20 of the embodiment, the minimum rotation speed Nemin is set according to whether the vehicle is traveling at a high vehicle speed or at a low vehicle speed or the vehicle is at a standstill, and the minimum rotation speed Nemin is set as the target rotation speed Ne* of the engine 22 when the engine 22 is operated at idle. However, it is also possible to directly set the target rotation speed Ne* of the engine 22 according to whether the vehicle is traveling at a high vehicle speed or at a low vehicle speed or the vehicle is at a standstill without setting the minimum rotation speed Nemin when a demand for an idle operation of the engine 22 has been made.

In the hybrid vehicle 20 of the embodiment, when it has been judged that the vehicle is at a standstill, the prescribed rotation speed N3 (for example, the same rotation speed as the prescribed rotation speed N1 (for example, 900 rpm and 1000 rpm) or a rotation speed in the vicinity thereof) is set as the minimum rotation speed Nemin. However, a rotation speed corresponding to the shift position SP may also be used as the prescribed rotation speed N3. For example, it is possible to adopt the following method. That is, when it has been judged that the vehicle is at a standstill and when the shift position SP is the drive position or the reverse position, as with the embodiment, the same rotation speed as the prescribed rotation speed N1 or a rotation speed in the vicinity thereof is used as the prescribed rotation speed N3, and when the shift position SP is the parking position, a rotation speed (for example, 800 rpm and 850 rpm) lower than the prescribed rotation speed N1 as the prescribed rotation speed N3 is used. If this is performed, it is possible to further improve the fuel consumption of the vehicle in operating the engine 22 at idle when the shift position SP is the parking position. Furthermore, it is also possible to adopt the following method. That is, when it has been judged that the vehicle is at a standstill, regardless of the shift position SP, a rotation speed (for example, 800 rpm and 850 rpm) lower than the prescribed rotation speed N1 is used as the prescribed rotation speed N3 and this prescribed rotation speed N3 is set as the minimum rotation speed Nemin, whereas when the value of the idle-operation demand flag F1 is 1, a rotation speed (for example, the same rotation speed as the prescribed rotation speed N1 or a rotation speed in the vicinity thereof) higher than the minimum rotation speed Nemin is set as the target rotation speed Ne* of the engine 22 when the shift position SP is the drive position or the reverse position and the minimum rotation speed Nemin is set as the target rotation speed Ne* of the engine 22 when the shift position SP is the parking position.

In the hybrid vehicle 20 of the embodiment, it is judged that the learning conditions hold when all of the conditions, such as the condition under which the cooling water temperature Tw is not less than the prescribed temperature Twref, the condition under which the vehicle speed V is not more than the vehicle speed V4, the condition under which the value of the idle-operation judgment flag F2 is 1 (the engine 22 is operated at idle), and the condition under which the target rotation speed Ne* of the engine 22 is not more than the prescribed rotation speed Nimax, hold. However, it is also possible to adopt the following judgment criterion. That is, if the condition under which the engine 22 is operated at idle holds, it is judged that the learning conditions hold regardless of other conditions or when at least one of the other conditions holds. For the learning conditions, it is possible to adopt the condition under which the rotation speed Ne of the engine 22 is not more than the prescribed rotation speed Nimax in place of or in addition to the condition under which the target rotation speed Ne* of the engine 22 is not more than the prescribed rotation speed Nimax. Also it is possible to consider, for example, the condition under which a prescribed duration has elapsed after a speed change by a staged transmission in a hardware configuration having the staged transmission between the motor MG2 and the ring gear shaft 32a, instead of the reduction gear 35 in addition to the above-described conditions.

In the hybrid vehicle 20 of the embodiment, the motor MG2 is attached to the ring gear shaft 32a functioning as the drive shaft via the reduction gear 35. However, the motor MG2 may be directly attached to the ring gear shaft 32a or the motor MG2 may be attached to the ring gear shaft 32a via a staged transmission, such as a two-stage transmission, a three-stage transmission and a four-stage transmission.

Figure 11:
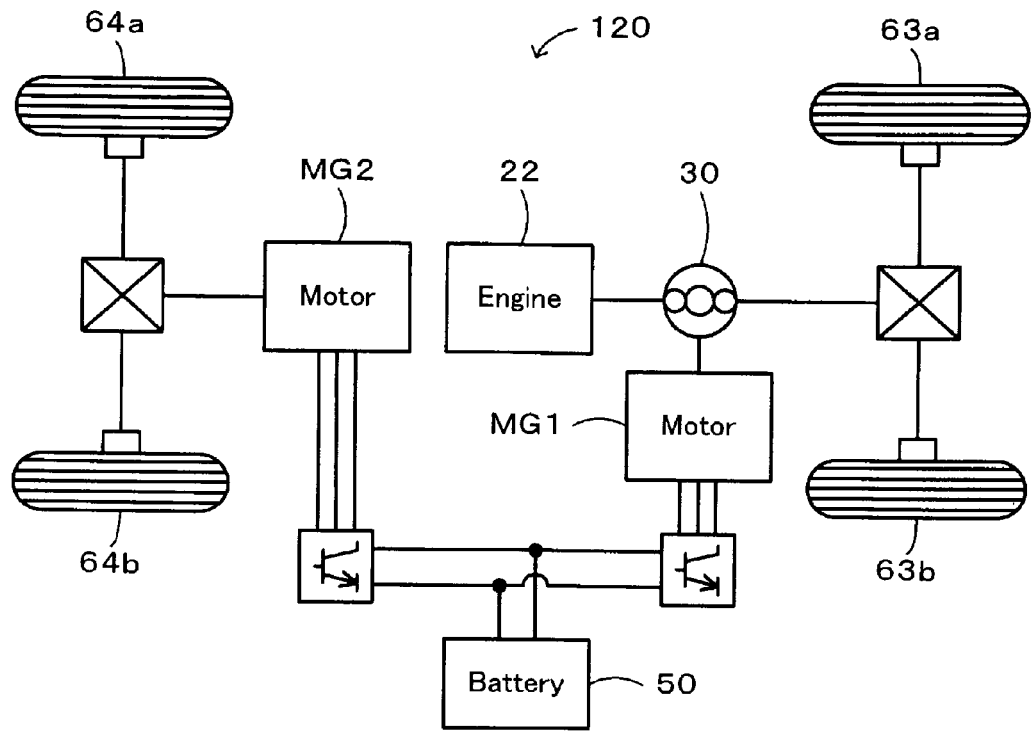
FIG. 11 is a block diagram showing a general configuration of a hybrid vehicle 120 in a modification.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 11, the power of the motor MG2 may be output to another axle (that is, an axle linked with wheels 64a and 64b), which is different from an axle connected with the ring gear shaft 32a (that is, an axle linked with the wheels 63a and 63b).

Figure 12:
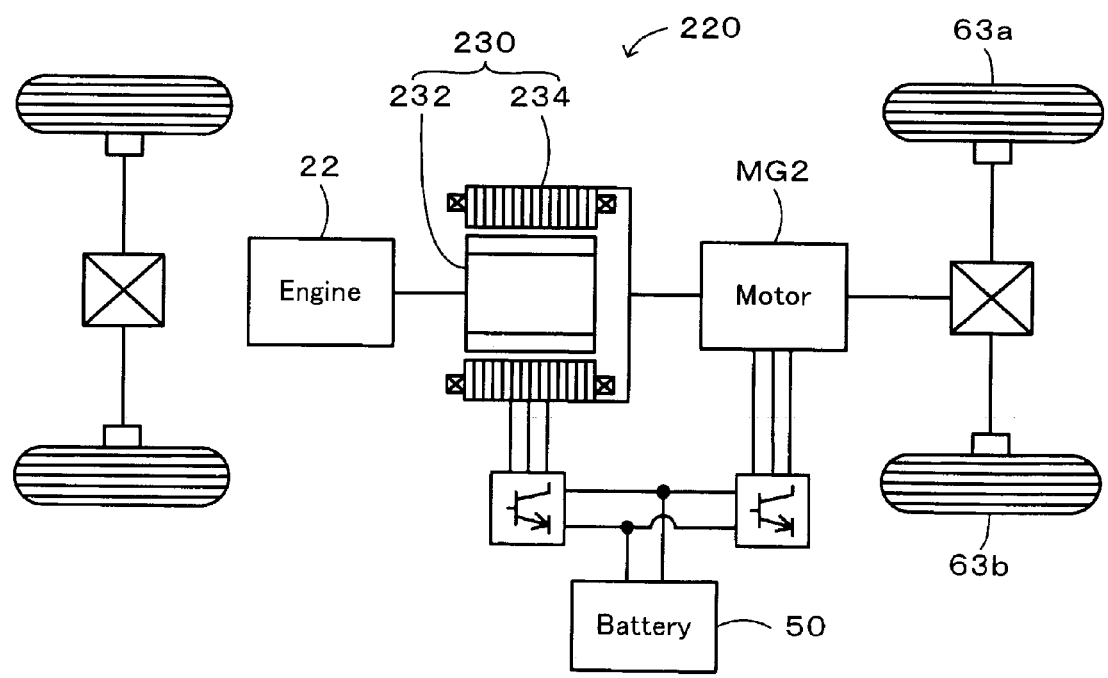
FIG. 12 is a block diagram showing a general configuration of a hybrid vehicle 220 in a modification.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 12, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a and 63b and transmits part of the power output from the engine 22 to the drive shaft while converting the residual part of the power into electric power.

In the embodiment, the present invention is used in the form of a hybrid vehicle. However, the present invention may also be in the form of a vehicle other than an automobile, such as a train, or in the form of a driving apparatus that is mounted on a vehicle along with an engine and a battery capable of charge and discharge. The present invention may also be in the form of a control method of a vehicle including an automobile and in the form of a control method of a driving apparatus.

Now a description will be given of the corresponding relationship between the principal elements of the embodiment and modifications thereto and the principal elements of the present invention described in Summary of the Invention. In the embodiment, the engine 22 corresponds to the "internal combustion engine," the power distribution and integration mechanism 30 and the motor MG1 correspond to the "electric power-mechanical power input output mechanism," the motor MG2 corresponds to the "electric motor," the battery 50 corresponds to the "generator," the speed sensor 88 corresponds to the "vehicle speed detection device," the hybrid electronic control unit 70 that executes the travel/standstill judgment routine of FIG. 2 that judges whether or not the vehicle is at a standstill on the basis of whether or not the status that the vehicle speed V is no more than the prescribed vehicle speed V1 has continued for a prescribed duration, corresponds to the "standstill judgment device." The hybrid electronic control unit 70, the engine ECU 24 that controls the engine 22 on the basis of the target rotation speed Ne* and the target torque Te*, and the motor ECU 40 that controls the motors MG1 and MG2 on the basis of the torque commands Tm1* and Tm2* correspond to the "control device." Incidentally, the hybrid electronic control unit 70 executes the control routine during a travel of FIG. 3 that involves setting the target rotation speed Ne* and the target torque Te* of the engine 22, and the torque commands Tm1* and Tm2* of the motors MG1 and MG2 and transmitting the set values to the engine ECU 24 and the motor ECU 40 so that the engine 22 is operated at idle at the minimum rotation speed Nemin for which the prescribed rotation speed N1, which is relatively low, is set and the torque demand Tr* set based on the accelerator opening Acc and the vehicle speed V is output to the ring gear shaft 32a functioning as the drive shaft when a demand for an idle operation has been made while the vehicle speed V is in a high vehicle speed range, and setting the target rotation speed Ne* and the target torque Te* of the engine 22, and the torque commands Tm1* and Tm2* of the motors MG1 and MG2 and transmitting the set values to the engine ECU 24 and the motor ECU 40 so that the engine 22 is operated at idle at the minimum rotation speed Nemin for which the prescribed rotation speed N2, which is relatively high, is set and the torque demand Tr* is output to the ring gear shaft 32a functioning as the drive shaft when a demand for an idle operation has been made while the vehicle speed V is in a low vehicle speed range, and executes the control routine during a standstill of FIG. 8 that involves setting the target rotation speed Ne* and the target torque Te* of the engine 22 and transmitting the set values to the engine ECU 24 so that the engine 22 is operated at idle at the minimum rotation speed Nemin for which the prescribed rotation speed N3, which is relatively low, is set when a demand for an idle operation has been made during a standstill. Also the hybrid electronic control unit 70 that executes the idle learning routine of FIG. 10 corresponds to the "control device." This hybrid electronic control unit 70 performs the learning of an idle controlled variable, which is a controlled variable used when the engine 22 is operated at idle, by judging that the learning conditions have held when all of the conditions, such as the condition under which the cooling water temperature Tw is not less than the prescribed temperature Twref, the condition under which the vehicle speed V is not more than the prescribed vehicle speed V4, the condition under which the value of the idle-operation judgment flag F2 is 1, and the condition under which the target rotation speed Ne* of the engine 22 is not more than the prescribed rotation speed Nimax, have held. Furthermore, the temperature sensor 23 that detects the cooling water temperature Tw of the engine 22 corresponds to the "temperature detection device." The hybrid electronic control unit 70 that executes the processing at Step S270 of the control routine during a travel shown in FIG. 3, which compares the power demand Pe* set on the basis of the torque demand Tr* during a travel with the threshold value Pref, corresponds to the "power operation demand judgment device," and the hybrid electronic control unit 70 that executes the processing at Steps S420 and S430 of the control routine during a standstill of FIG. 8, which compares the state of charge SOC of the battery 50 with the prescribed value S1 when it has been judged during a standstill that the battery 50 is not being charged, corresponds to the "charge-operation demand judgment device." The shift position sensor 82 corresponds to the "shift position detection device." The motor MG1 corresponds to the "generator," and the power distribution and integration mechanism 30 corresponds to the "three-shaft type power input output module." Also the pair-rotor motor 230 corresponds to the "electric power-mechanical power input output mechanism." In this connection, the "internal combustion engine" is not limited to an internal combustion engine that outputs power by using a hydrocarbon-based fuel, such as gasoline and light oil, and any type of internal combustion engine, such as a hydrogen engine, may be used. The "electric power-mechanical power input output mechanism" is not limited to a combination of the power distribution and integration mechanism 30 and the motor MG1 or a pair-rotor motor 230, and any device may be used so long as it is connected to a drive shaft coupled to an axle and connected to an output shaft of an internal combustion engine so as to be rotatable independently of the drive shaft and can input and output mechanical power to and from the drive shaft and the output shaft, with the input and output of electric power and mechanical power performed. The "electric motor" is not limited to the motor MG2 that is configured as a synchronous motor generator, and any type of electric motor, such as an induction motor, may be used so long as it can input and output power to and from a drive shaft. The "generator" is not limited to the battery 50 as a secondary battery, and any device, such as a capacitor, may be used so long as it can exchange electric power with the electric power-mechanical power input output mechanism and the electric motor. The "vehicle speed detection device" is not limited to the speed sensor 88, and any device may be used so long as it detects vehicle speeds, such as a device that calculates the vehicle speed V on the basis of the rotation speed of the gear shaft 32*a* as a drive shaft and a device that computes the vehicle speed V on the basis of a signal from a wheel speed sensor attached to the drive wheels 63*a* and 63*b* and a driven wheel. The "standstill judgment device" is not limited to a device that judges whether or not the vehicle is at a standstill on the basis of whether or not the status that the vehicle speed V is not more than the prescribed vehicle speed V1 has continued for a prescribed duration, and any device may be used so long as it judges whether or not the vehicle is at a standstill on the basis of vehicle speeds, such as a device that judges that the vehicle is at a standstill when the vehicle speed V is not more than the prescribed vehicle speed V1 and that the vehicle is traveling when the vehicle speed V is higher than the prescribed vehicle speed V1, a device that judges the vehicle is at a standstill when the brake pedal 85 is depressed in addition to fact that the status that the vehicle speed V is not more than the prescribed vehicle speed V1 has continued for a prescribed duration, and a device that judges whether or not the vehicle is at a standstill by using, as the prescribed vehicle speed V1, a vehicle speed higher than the vehicle speed that is used when a plurality of conditions have not established, when the learning condition does not hold even when the condition under which the target rotation speed Ne* of the engine 22 is not more than the prescribed rotation speed Nimax holds. The "control device" is not limited to a combination of the hybrid electronic control unit 70, the engine ECU 24 and the motor ECU 40, and the control device may be constituted by a single electronic control unit. Furthermore, the "control device" is not limited to a device that sets the target rotation speed Ne* and the target torque Te* of the engine 22, and the torque commands Tm1* and Tm2* of the motors MG1 and MG2 and controls the engine 22 and the motors MG1 and MG2 so that the engine 22 is operated at idle at the minimum rotation speed Nemin for which the prescribed rotation speed N1, which is relatively low, is set and the torque demand Tr* is set based on the accelerator opening Acc and the vehicle speed V output to the ring gear shaft 32*a* functioning as the drive shaft when a demand for an idle operation has been made while the vehicle speed V is in a high vehicle speed range, sets the target rotation speed Ne* and the target torque Te* of the engine 22, and the torque commands Tm1* and Tm2* of the motors MG1 and MG2 and controls the engine 22 and the motors MG1 and MG2 so that the engine 22 is operated at idle at the minimum rotation speed Nemin for which the prescribed rotation speed N2, which is relatively high, is set and the torque demand Tr* is output to the ring gear shaft 32*a* functioning as the drive shaft when a demand for an idle operation has been made while the vehicle speed V is in a low vehicle speed range, and sets the target rotation speed Ne* and the target torque Te* of the engine 22 and controls the engine 22 and the motors MG1 and MG2 so that the engine 22 is operated at idle at the minimum rotation speed Nemin for which the prescribed rotation speed N3, which is relatively low, is set when a demand for an idle operation has been made during a standstill. Any device may be used so long as it is a control device that controls the internal combustion engine, the electric power-mechanical power input output mechanism and the electric motor so that an idle operation of the internal combustion engine is performed at a first rotation speed and the vehicle travels by use of the drive power demand required for the travel when a demand for an idle operation of the internal combustion engine has been made and in a case where it has been judged by the standstill judgment device that the vehicle is not at a standstill and during a high vehicle speed travel which is such that the vehicle speed is in a prescribed high vehicle speed range, controls the internal combustion engine, the electric power-mechanical power input output mechanism and the electric motor so that an idle operation of the internal combustion engine is performed at a second rotation speed higher than a first rotation speed and the vehicle travels by use of the drive power demand required for the travel in a case where it has been judged by the standstill judgment device that the vehicle is not at a standstill and during a low vehicle speed travel which is such that the vehicle speed is in a prescribed low vehicle speed range, and controls the internal combustion engine so that an idle operation of the internal combustion engine is performed at a third rotation speed lower than the second rotation speed during a standstill in a case where it has been judged by the standstill judgment device that the vehicle is at a standstill. Examples of this device includes a device that makes a changeover between a high vehicle speed range and a low vehicle speed range, i.e., a changeover between the prescribed rotation speed N1 and the prescribed rotation speed N2 of the minimum rotation speed Nemin of the engine 22 with hysteresis, a device that directly sets the target rotation speed Ne* of the engine 22 according to whether the vehicle is during a high vehicle speed travel or a low vehicle speed travel or at a standstill without setting the minimum rotation speed Nemin of the engine 22 when a demand for an idle operation of the engine 22 has been made, a device that sets a rotation speed suitable for the shift position SP as the prescribed rotation speed N3 set as the minimum rotation speed Nemin of the engine 22 during a standstill, a device that performs the learning of an idle controlled variable, which is a controlled variable used when the engine 22 is operated at idle, by judging that the learning conditions have held when all of the conditions, such as the condition under which the cooling water temperature Tw is not less than the prescribed temperature Twref, the condition under which the vehicle speed V is not more than the prescribed vehicle speed V4, the condition under which the value of the idle-operation judgment flag F2 is 1, and the condition under which the target rotation speed Ne* of the engine 22 is not more than the prescribed rotation speed Nimax, have held. Incidentally, the corresponding relationship between the principal elements of the embodiment and modifications thereto and the principal elements of the present invention described in Summary of the Invention, does not limit the elements of the present invention described in Summary of the Invention, because the embodiment is an example to concretely describe the best mode for carrying out the present invention described in Summary of the Invention. This is because the interpretation of the present invention described in Summary of the Invention should be performed on the basis of the descriptions given in Summary of the Invention, and because the embodiment is a concrete example of the present invention described in Summary of the Invention.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2007-063969 filed on Mar. 13, 2007 including specification, drawings and claims are incorporated herein by reference in their entirety.

What is claimed is:

1. A vehicle, comprising:
   an internal combustion engine;
   an electric power-mechanical power input output mechanism that is connected to a drive shaft coupled to an axle, and connected to an output shaft of said internal combustion engine so as to be rotatable independently of the drive shaft, and can input and output mechanical power to and from said drive shaft and said output shaft, with the input and output of electric power and mechanical power;
   an electric motor that can output mechanical power to said drive shaft;
   a generator capable of exchanging electric power with said electric power-mechanical power input output mechanism and said electric motor;
   a vehicle speed detection device that detects a vehicle speed;
   a standstill judgment device that judges whether or not a vehicle is at a standstill on the basis of said detected vehicle speed; and
   a control device that when a demand for an idle operation of said internal combustion engine has been made, controls said internal combustion engine, said electric power-mechanical power input output mechanism and said electric motor so that said idle operation of said internal combustion engine is performed at a first rotation speed and the vehicle travels by use of a power demand required for the travel in a case where it has been judged by said standstill judgment device that said vehicle is not at a standstill and during a high vehicle speed travel which is such that said detected vehicle speed is in a prescribed high vehicle speed range, controls said internal combustion engine, said electric power-mechanical power input output mechanism and said electric motor so that said idle operation of said internal combustion engine is performed at a second rotation speed higher than said first rotation speed and the vehicle travels by use of the power demand required for the travel in a case where it has been judged by said standstill judgment device that said vehicle is not at a standstill and during a low vehicle speed travel which is such that said detected vehicle speed is in a prescribed low vehicle speed range, and controls the internal combustion engine so that said idle operation of said internal combustion engine is performed at a third rotation speed lower than said second rotation speed during a standstill in a case where it has been judged by said standstill judgment device that said vehicle is at a standstill.

2. A vehicle according to claim 1, wherein said control device is a device that learns an idle controlled variable, which is a controlled variable for said idle operation of said internal combustion engine when prescribed learning conditions have held, the prescribed learning conditions including an operating condition under which said internal combustion engine is operated at idle, and a rotation speed condition under which the rotation speed of said internal combustion engine or the target rotation speed during said idle operation of said internal combustion engine is not less than said third rotation speed and lower than said second rotation speed lower than a learning upper limit rotation speed.

3. A vehicle according to claim 2, further comprising:
   a temperature detection device that detects the temperature of a cooling medium of said internal combustion engine,
   said prescribed learning conditions being conditions including a temperature condition under which the temperature of said detected cooling medium is not less than a prescribed temperature and a vehicle speed condition under which said detected vehicle speed is not more than a prescribed vehicle speed.

4. A vehicle according to claim 2,
   wherein said control device is a device that learns said idle controlled variable by judging that said learning conditions have held when all of the plurality of conditions including said operating condition and the rotation speed condition have held and
   wherein said standstill judgment device sets, as a standstill-judgment vehicle speed range, a first range including the value 0 when a plurality of conditions among said prescribed learning conditions do not hold, sets, as said standstill-judgment vehicle speed range, a second range wider than the first range when only said rotation speed condition among said prescribed learning conditions does not hold, judges that said vehicle is at a standstill when said detected vehicle speed is in said set standstill-judgment vehicle speed range for a specified duration, and judges that said vehicle is not at a standstill when said detected vehicle speed is outside said set standstill-judgment vehicle speed range.

5. A vehicle according to claim 1, wherein said standstill judgment device is a device that judges that said vehicle is at a standstill when said detected vehicle speed is in standstill-judgment vehicle speed range including the value 0 for a specified duration, and judges that said vehicle is not at a standstill when said detected vehicle speed is outside said standstill-judgment vehicle speed range.

6. A vehicle according to claim 1, wherein said control device is a device that makes a changeover between said prescribed high vehicle speed range and said prescribed low vehicle speed range with hysteresis given to said detected vehicle speed.

7. A vehicle according to claim 1, wherein said control device is a device that makes a changeover of a rotation speed during said idle operation of said internal combustion engine between said first rotation speed and said second rotation speed with hysteresis given to said detected vehicle speed.

8. A vehicle according to claim 1, wherein said control device is a device that sets said first rotation speed as a minimum rotation speed of said internal combustion engine during said high vehicle speed travel, sets said second rotation speed as said minimum rotation speed during said low vehicle speed travel, sets said third rotation speed as said minimum rotation speed during said standstill, and performs control so that said internal combustion engine is operated at the set minimum rotation speed when a demand for said idle operation of said internal combustion engine has been made.

9. A vehicle according to claim 1, wherein said demand for said idle operation of said internal combustion engine is a demand made on the basis of at least one of a plurality of demands, including a demand for a warm-up operation of said internal combustion engine, a demand for an idle learning of said internal combustion engine, and a demand for an actuation of equipment that uses energy from said internal combustion engine.

10. A vehicle according to claim 1, further comprising:
a status detection device that detects the status of said generator;
a power-operation demand judgment device that judges whether or not a demand for a power operation, which is a demand for an operation of said internal combustion engine, has been made on the basis of the vehicle power demand required by said vehicle during said high vehicle speed travel or during said low vehicle speed travel; and
a charge-operation demand judgment device that judges whether or not a demand for a charge operation, which is a demand for an operation of said internal combustion engine for charging the generator on the basis of said detected status of the generator, has been made during said standstill;
said control device being a device that controls said internal combustion engine, said electric power-mechanical power input output mechanism and said electric motor so that said internal combustion engine is operated at a target drive point based on said vehicle power demand regardless of a demand for said idle operation of said internal combustion engine and the vehicle travels by use of said drive power demand when it has been judged by said power operation demand judgment device that said power operation demand has been made during said high vehicle speed travel or during said low vehicle speed travel, and controls said internal combustion engine and said electric power-mechanical power input output mechanism so that said generator is charged regardless of a demand for said idle operation of said internal combustion engine when it has been judged that said demand for a charge operation has been made during said standstill.

11. A vehicle according to claim 1, further comprising:
a shift position detection device that detects a shift position,
said control device being a device that performs control when said detected shift position is a parking position during said standstill so that said internal combustion engine is operated at idle by using, as said third rotation speed, a low rotation speed compared to a case where said detected shift position is a travel position.

12. A vehicle according to claim 1, wherein said electric power-mechanical power input output mechanism is a mechanism that comprises a generator that inputs and outputs mechanical power, and a three-shaft power input output module that is connected to the three shafts of said drive shaft, said output shaft and a rotating shaft of said generator and, on the basis of the mechanical power input and output to and from two out of the three shafts, inputs and outputs mechanical power to a remaining shaft.

13. A driving apparatus that is mounted on a vehicle along with an internal combustion engine and an accumulator unit capable of charge and discharge, said driving apparatus comprising:
an electric power-mechanical power input output mechanism that is connected to a drive shaft coupled to an axle and connected to an output shaft of said internal combustion engine so as to be rotatable independently of the drive shaft, can exchange electric power with said accumulator unit, and can input and output mechanical power to and from said drive shaft and said output shaft, with the input and output of electric power and mechanical power;
an electric motor that can exchange electric power with said accumulator unit and can output mechanical power to said drive shaft;
a standstill judgment device that judges whether or not the vehicle is at a standstill on the basis of a vehicle speed; and
a control device that when a demand for an idle operation of said internal combustion engine has been made, controls said internal combustion engine, said electric power-mechanical power input output mechanism and said electric motor so that said idle operation of said internal combustion engine is performed at a first rotation speed and the vehicle travels by use of a power demand required for the travel in a case where it has been judged by said standstill judgment device that said vehicle is not at a standstill and during a high vehicle speed travel which is such that a detected vehicle speed is in a prescribed high vehicle speed range, controls said internal combustion engine, said electric power-mechanical power input output mechanism and said electric motor so that said idle operation of said internal combustion engine is performed at a second rotation speed higher than said first rotation speed and the vehicle travels by use of the power demand required for the travel in a case where it has been judged by said standstill judgment device that said vehicle is not at a standstill and during a low vehicle speed travel which is such that said detected vehicle speed is in a prescribed low vehicle speed range, and controls the internal combustion engine so that said idle operation of said internal combustion engine is performed at a third rotation speed lower than said second rotation speed during a standstill in a case where it has been judged by said standstill judgment device that said vehicle is at a standstill.

14. A control method of a vehicle, comprising:
an internal combustion engine;
an electric power-mechanical power input output mechanism that is connected to a drive shaft coupled to an axle, and connected to an output shaft of said internal combustion engine so as to be rotatable independently of the drive shaft, and can input and output mechanical power to and from said drive shaft and said output shaft, with the input and output of electric power and mechanical power;

an electric motor that can output mechanical power to said drive shaft;

a generator capable of exchanging electric power with said electric power-mechanical power input output mechanism and said electric motor;

said control method of a vehicle comprising the steps of:

(a) judging whether or not a vehicle is at a standstill on the basis of a vehicle speed; and (b) when a demand for an idle operation of said internal combustion engine has been made, controlling said internal combustion engine, said electric power-mechanical power input output mechanism and said electric motor so that said idle operation of said internal combustion engine is performed at a first rotation speed and the vehicle travels by use of a power demand required for the travel in a case where it has been judged that said vehicle is not at a standstill and during a high vehicle speed travel which is such that a detected vehicle speed is in a prescribed high vehicle speed range, controlling said internal combustion engine, said electric power-mechanical power input output mechanism and said electric motor so that said idle operation of said internal combustion engine is performed at a second rotation speed higher than said first rotation speed and the vehicle travels by use of the power demand required for the travel in a case where it has been judged that said vehicle is not at a standstill and during a low vehicle speed travel which is such that said detected vehicle speed is in a prescribed low vehicle speed range, and controlling the internal combustion engine so that said idle operation of said internal combustion engine is performed at a third rotation speed lower than said second rotation speed during a standstill in a case where it has been judged that said vehicle is at a standstill.

15. A control method of a driving apparatus that is mounted on a vehicle along with an internal combustion engine and an accumulator unit capable of charge and discharge, said driving apparatus comprising:

an electric power-mechanical power input output mechanism that is connected to a drive shaft coupled to an axle and connected to an output shaft of said internal combustion engine so as to be rotatable independently of the drive shaft, can exchange electric power with said accumulator unit, and can input and output mechanical power to and from said drive shaft and said output shaft, with the input and output of electric power and mechanical power;

an electric motor that can exchange electric power with said accumulator unit and can output mechanical power to said drive shaft;

said control method of a driving apparatus comprising the steps of:

(a) judging whether or not a vehicle is at a standstill on the basis of a vehicle speed; and (b) when a demand for an idle operation of said internal combustion engine has been made, controlling said internal combustion engine, said electric power-mechanical power input output mechanism and said electric motor so that said idle operation of said internal combustion engine is performed at a first rotation speed and the vehicle travels by use of a power demand required for the travel in a case where it has been judged that said vehicle is not at a standstill and during a high vehicle speed travel which is such that a detected vehicle speed is in a prescribed high vehicle speed range, controlling said internal combustion engine, said electric power-mechanical power input output mechanism and said electric motor so that said idle operation of said internal combustion engine is performed at a second rotation speed higher than said first rotation speed and the vehicle travels by use of the power demand required for the travel in a case where it has been judged that said vehicle is not at a standstill and during a low vehicle speed travel which is such that said detected vehicle speed is in a prescribed low vehicle speed range, and controlling the internal combustion engine so that said idle operation of said internal combustion engine is performed at a third rotation speed lower than said second rotation speed during a standstill in a case where it has been judged that said vehicle is at a standstill.

* * * * *